United States Patent

Nagasaka et al.

Patent Number: 5,951,116
Date of Patent: Sep. 14, 1999

[54] BRAKE CONTROL SYSTEM FOR A MOTOR VEHICLE

[75] Inventors: Mitsuhiro Nagasaka; Toshio Takayama, both of Yamanashi-ken, Japan

[73] Assignee: Tokico Ltd., Kanagawa-ken, Japan

[21] Appl. No.: 09/021,301

[22] Filed: Feb. 10, 1998

[30] Foreign Application Priority Data

Feb. 10, 1997 [JP] Japan .................................. 9-027100

[51] Int. Cl.⁶ ...................................................... B60T 8/00
[52] U.S. Cl. ...................... 303/14; 188/106 P; 188/358; 188/359; 188/151 A; 303/3; 303/15; 303/10; 60/545; 60/566
[58] Field of Search .................... 303/122, 122.03, 303/122.04, 122.05, 122.11, 199, 119.2, 155, 113.4, 3, 20, 13, 15, 14, 10, 119.3, 16, 52, 17, 6.01; 188/151 A, 355–359, 156, 158, 106 P; 701/76, 70; 60/545, 565, 566, 582, 534; 91/369.6, 369.1

[56] References Cited

U.S. PATENT DOCUMENTS

| | | | |
|---|---|---|---|
| 4,166,654 | 9/1979 | Snodgrass | 303/14 |
| 4,395,883 | 8/1983 | Melinat | 60/545 |
| 4,398,389 | 8/1983 | Horvath | 60/545 |
| 4,436,347 | 3/1984 | Stumpe | 303/15 |
| 4,580,847 | 4/1986 | Burgdorf | 60/545 |
| 4,812,777 | 3/1989 | Shirai | 303/14 |
| 4,902,075 | 2/1990 | Uno et al. | 303/14 |
| 4,967,643 | 11/1990 | Siegel | 60/545 |
| 5,106,167 | 4/1992 | Matsuda | 303/15 |
| 5,152,585 | 10/1992 | Patient et al. | 303/14 |
| 5,172,962 | 12/1992 | Takata . | |
| 5,186,525 | 2/1993 | Sato et al. | 188/358 |
| 5,201,573 | 4/1993 | Leiber et al. | 60/545 |
| 5,230,549 | 7/1993 | Osada et al. | 303/3 |
| 5,246,281 | 9/1993 | Leppek | 60/545 |
| 5,302,008 | 4/1994 | Miyake et al. | 303/14 |
| 5,445,441 | 8/1995 | Inagawa et al. | 303/10 |
| 5,531,509 | 7/1996 | Kellner et al. | 303/15 |
| 5,544,948 | 8/1996 | Schmidt et al. . | |
| 5,567,021 | 10/1996 | Gaillard | 303/3 |
| 5,588,718 | 12/1996 | Winner et al. | 303/14 |
| 5,690,396 | 11/1997 | Johnston et al. | 303/3 |

FOREIGN PATENT DOCUMENTS

4-232154  8/1992  Japan .

*Primary Examiner*—Douglas C. Butler
*Attorney, Agent, or Firm*—Wenderoth, Lind & Ponack, L.L.P.

[57] ABSTRACT

A plurality of electrical fluid pressure control valves or a plurality of groups each comprised of a plurality of electrical fluid pressure control valves are operatively associated with respective power supply replays. The electrical fluid pressure control valves and a plurality of electrical switch valves are connected in parallel to a power source. A plurality of failure sensors are associated with the respective electrical fluid pressure control valves or the respective groups so as to detect whether an electrical system failure in any one of the electrical fluid pressure control valves or the groups occurs. If occurs, failure control unit is operable to control a corresponding one of the power supply relays so as to cause a corresponding one of the electrical switch valves to selectively connect a corresponding one of the wheel cylinders to a master cylinder.

5 Claims, 24 Drawing Sheets

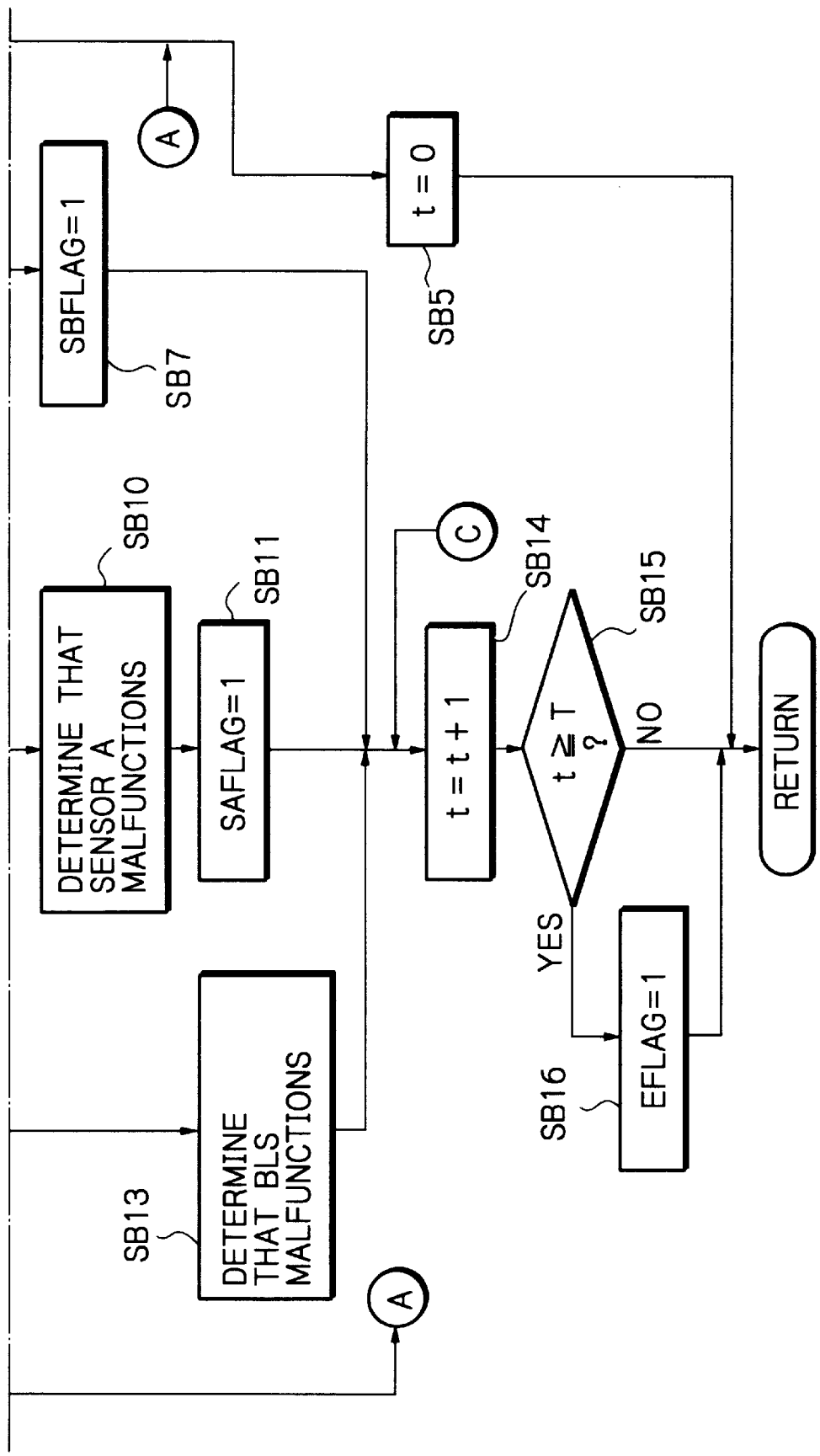

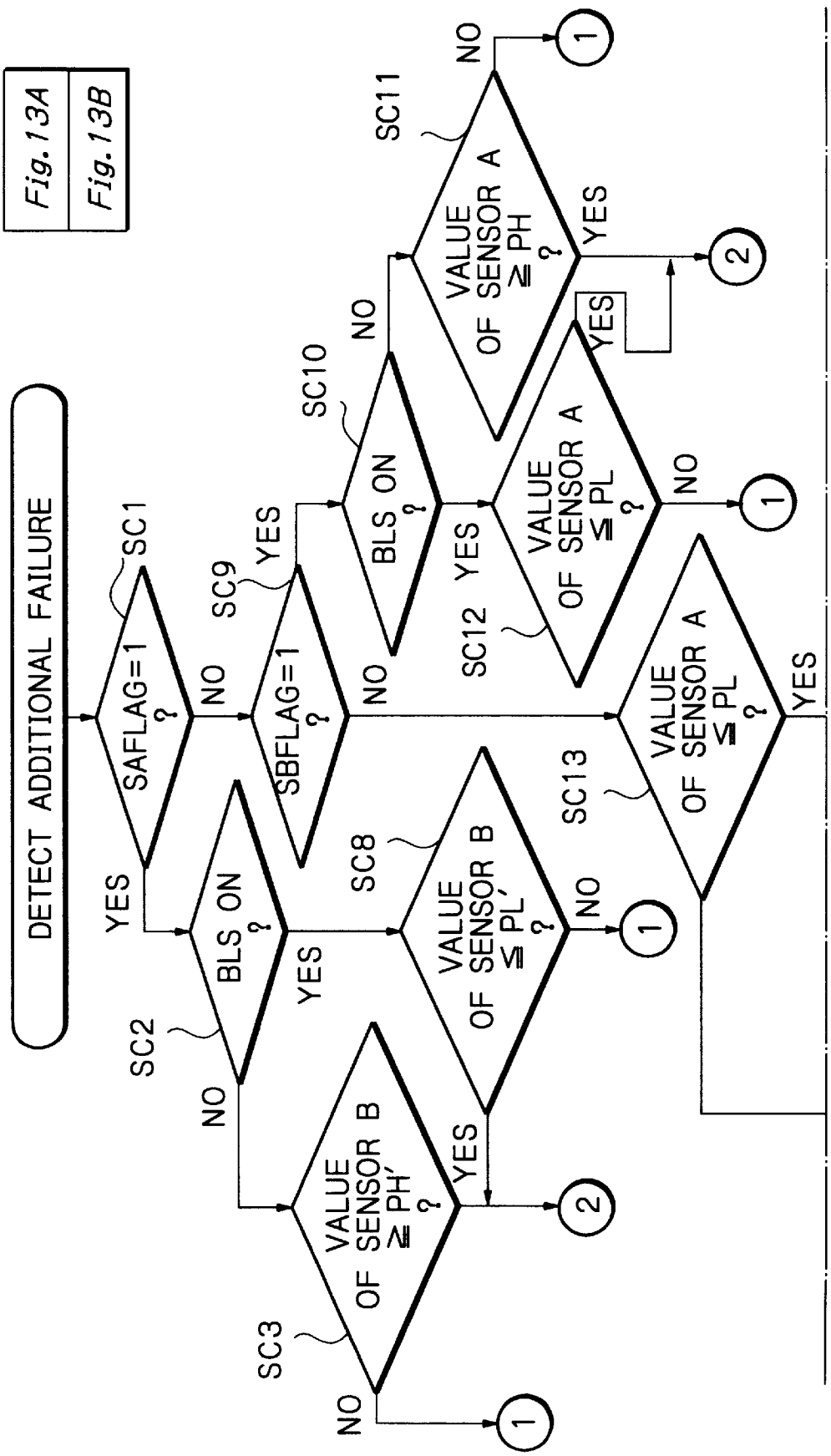

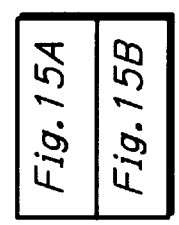
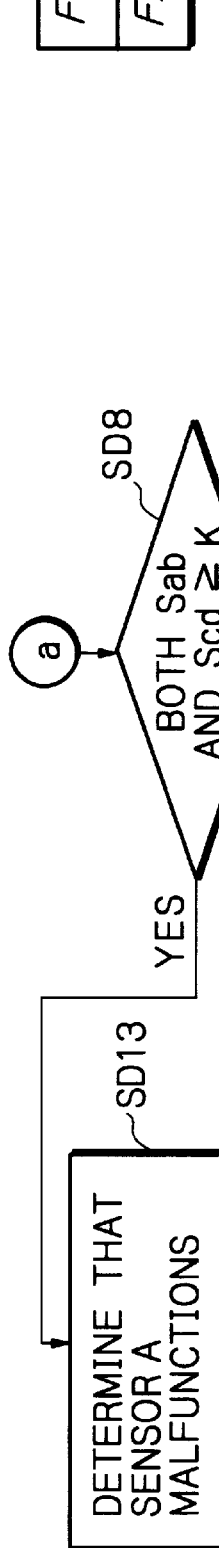

BRAKE CONTROL SYSTEM FOR A MOTOR VEHICLE

BACKGROUND OF THE INVENTION

The present invention relates to brake control systems for motor vehicles and more particularly, to a fail-safe arrangement in such a brake control system.

A conventional vehicle brake control system typically includes a depression (or brake operation) sensor for detecting the amount of operation of a brake foot pedal, electrical fluid pressure control valves for adjusting the pressure of a brake fluid to be transmitted from a source of fluid pressure to wheel cylinders, brake fluid pressure control means for controlling the operation of the electrical fluid pressure control valves based on output signals from the depression sensor, a master cylinder for transmitting to the wheel cylinders fluid pressure as developed in response to action of the brake foot pedal, electrical switch valves connected between the electrical fluid pressure control valves and the wheel cylinders and between the master cylinder and the wheel cylinders so as to selectively connect the wheel cylinders to either the electrical fluid pressure control valves or the master cylinder, and switch control means for controlling the operation of the electrical switch valves.

In such a conventional brake control system, the electrical fluid pressure control valves are operatively associated with either the respective wheels or a plurality of groups each comprised of a plurality of wheels. Also, the electrical switch valves are operatively associated with either the respective electrical fluid pressure control valves or a plurality of groups each comprised of a plurality of electrical fluid pressure control valves. The electrical fluid pressure control valves and the electrical switch valves are all connected through a common power supply relay to a power source.

Also, only one depression sensor is provided to detect the amount of operation of the brake foot pedal.

If, for example, an electrical failure occurs in any one of the electrical fluid pressure control valves, brake fluid pressure is inadvertently developed in the absence of brake action. For fail-safe purposes, the power supply relay is connected between all of the electrical fluid pressure control valves and the switch valves and the power source and adapted to interrupt the supply of electrical current to all of the electrical fluid pressure control valves and the switch valves. The electrical switch valves then enable brake fluid pressure developed in the master cylinder in response to action of the brake foot pedal to be transmitted directly to the respective wheels.

Such an arrangement is, however, incapable of providing power assistance. As a result, the driver is required to depress the brake foot pedal with a force significantly greater than that normally required. There is thus a need to provide an improved brake control system which provides a sufficient fail-safe function. A brake booster is useful in the event of an electrical system failure, but is highly costly.

Another problem is that the prior art brake control system is provided with only one depression sensor. If the depression sensor malfunctions, the system is no longer capable of providing a sufficient fail-safe function.

Accordingly, it is an object of the present invention to provide a vehicle brake control system which provides a sufficient fail-safe function.

SUMMARY OF THE INVENTION

In order to achieve the foregoing object, according to a first aspect of the present invention, there is provided a vehicle brake control system comprising a depression sensor for detecting the amount of operation of a brake pedal and providing a corresponding output signal, a plurality of electrical fluid pressure control valves operative to adjust brake fluid pressure to be transmitted from a source of fluid pressure to wheel cylinders, brake fluid pressure control means for controlling operation of the electrical fluid pressure control valves based on the output signal of the depression sensor, a master cylinder for transmitting to the wheel cylinders in response to operation of the brake pedal, a plurality of electrical switch valves connected between the electrical fluid pressure control valves and the wheel cylinders and between the master cylinder and the wheel cylinders and adapted to permit selective connection between the wheel cylinders and the electrical fluid pressure control valves and between the wheel cylinders and the master cylinder, and switch control means for controlling operation of the electrical switch valves, the electrical fluid pressure control valves being associated with either respective wheels or a plurality of first groups each comprised of a plurality of wheels, and the electrical switch valves being associated with either the respective electrical fluid pressure control valves or a plurality of second groups each comprised of a plurality of electrical fluid pressure control valves, the electrical fluid pressure control valves or the first groups being connected to corresponding power supply relays through which the electrical fluid pressure control valves and the electrical switch valves are connected in parallel to a power source, failure sensor means associated with the respective electrical fluid pressure control valves or the first groups for sensing a failure, and failure control means operative when a failure in any of the electrical fluid pressure control valves and the first groups is detected by the failure sensor means and adapted to control a corresponding one of the power supply relays so as to cause only a corresponding one of the electrical switch valves to selectively connect a corresponding one of the wheel cylinders to the master cylinder.

The electrical fluid pressure control valves are associated with either the respective wheels or the first groups each comprised of a plurality of wheels. The electrical fluid pressure control valves or the first groups are connected to corresponding power supply relays through which the electrical fluid pressure control valves and the electrical switch valves are connected in parallel to the power source. In addition, if a failure in any one of the electrical fluid pressure control valves and the first groups is detected by the failure sensor means, then the failure control means is operable to control a corresponding one of the power supply relays so as to cause only a corresponding one of the electrical switch valves to selectively connect a corresponding one of the wheel cylinders to the master cylinder. As such, the other electrical switch valves remain in their state so that brake fluid pressure may be transmitted from the properly operated electrical fluid pressure control valves or first groups to the corresponding wheel cylinders.

According to a second aspect of the present invention, there is provided a vehicle brake control system comprising a depression sensor for detecting the amount of operation of a brake pedal and providing a corresponding output signal, a plurality of electrical fluid pressure control valves operative to adjust brake fluid pressure to be transmitted from a source of fluid pressure to wheel cylinders, brake fluid pressure control means for controlling operation of the electrical fluid pressure control valves based on the output signal of the depression sensor, a master cylinder for transmitting to the wheel cylinders in response to operation of the brake pedal, a plurality of electrical switch valves connected between the electrical fluid pressure control valves and the wheel cylinders and between the master cylinder and the wheel cylinders and adapted to permit selective connection between the wheel cylinders and the electrical fluid pressure control valves and between the wheel cylinders and the master cylinder, and switch control means for controlling operation of the electrical switch valves, the depression sensors including at least two depression sensors for detecting the amount of operation of the brake pedal and providing corresponding output signals, a brake switch for detecting whether the brake pedal is depressed and providing a corresponding output signal, and output switch control means for causing one of the two depression sensors to send an output signal to the brake fluid pressure control means and receiving the output signals from the brake switch and the depression sensors so as to determine as to whether a failure in the one depression sensor occurs, whereby the output signal of the other depression sensor is transmitted to the brake fluid pressure control means if a failure in the one depression sensor occurs.

There are provided at least two depression sensors. In addition, the output control means is operable to cause one of the two depression sensors to send an output signal to the brake fluid pressure control means. The output switch control means also receive the output signals from the brake switch and the two depression sensors so as to determine as to whether or not a failure in the one depression sensor occurs. If occurs, the output switch control means is operable to cause the other depression sensor to send its output signal to the brake fluid pressure control means.

According to a third aspect of the present invention, there is provided a vehicle brake control system comprising a depression sensor for detecting the amount of operation of a brake pedal and providing a corresponding output signal, a plurality of electrical fluid pressure control valves operative to adjust brake fluid pressure to be transmitted from a source of fluid pressure to wheel cylinders, brake fluid pressure control means for controlling operation of the electrical fluid pressure control valves based on the output signal of the depression sensor, a master cylinder for transmitting to the wheel cylinders in response to operation of the brake pedal, a plurality of electrical switch valves connected between the electrical fluid pressure control valves and the wheel cylinders and between the master cylinder and the wheel cylinders and adapted to permit selective connection between the wheel cylinders and the electrical fluid pressure control valves and between the wheel cylinders and the master cylinder, and switch control means for controlling operation of the electrical switch valves, the depression sensors including at least three depression sensors for detecting the amount of operation of the brake pedal and providing corresponding output signals, and output switch control means for causing one of the three depression sensors to send an output signal to the brake fluid pressure control means and receiving output signals from the three depression sensors so as to determine as to whether a failure in the one depression sensors occurs, whereby the output signals of the other two depression sensors are transmitted to the brake fluid pressure control means if a failure in the one depression sensor occurs.

There are provided at least three depression sensors. In addition, the output control means is operable to cause one of the three depression sensors to send an output signal to the brake fluid pressure control means. The output switch control means also receive the output signals from the three depression sensors so as to determine as to whether or not a failure in the one depression sensor occurs. If occurs, the output switch control means is operable to cause the other depression sensors to send their output signal to the brake fluid pressure control means.

BRIEF DESCRIPTION OF THE DRAWINGS

The present invention may be best understood by reference to the following description of preferred embodiments when taken in conjunction with the accompanying drawings, in which:

FIGS. 11, 11A and 11B are a flow chart showing a part of control process used in the sixth embodiment of the vehicle brake control system to determine whether or not an electrical system failure occurs;

FIGS. 13, 13A and 13B are a flow chart showing control process used in the sixth embodiment of the vehicle brake control system to determine whether or not an additional electrical system failure occurs;

FIGS. 15, 15A and 15B are a flow chart showing another part of the control process used in the seventh embodiment of the vehicle brake control system to determine whether or not an electrical system failure occurs;

FIGS. 17, 17A, 17B and 17C is a flow chart showing a part of control process used in a vehicle brake control system according to an eighth embodiment of the present invention to determine whether or not an electrical system failure occurs;

DESCRIPTION OF THE PREFERRED EMBODIMENTS

Figure 1:
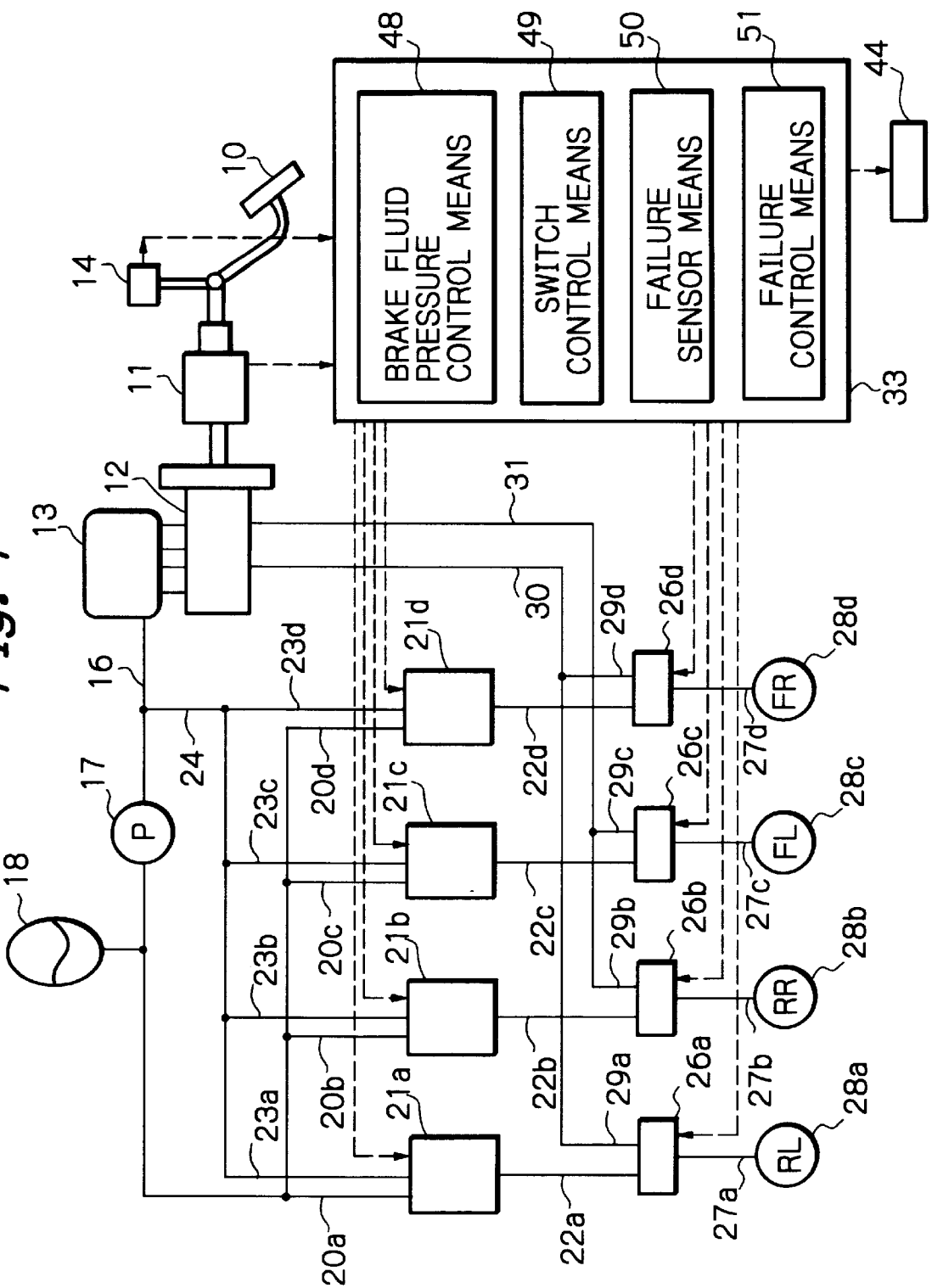
FIG. 1 is a block diagram of a pressurized fluid circuit used in a vehicle brake control system according to a first embodiment of the present invention.

Referring now to FIG. 1, there is illustrated a brake control system made according to a first embodiment of the present invention.

In FIG. 1, reference numeral 10 designates a brake foot pedal. The brake foot pedal 10 is connected through a depression sensor 11 to a tandem master cylinder 12 within which two fluid pressure chambers (not show) are defined. The depression sensor 11 is operable to detect the amount of operation of the brake foot pedal 10 or the amount of force applied to the brake foot pedal 10. A reservoir tank 13 is communicable with the two fluid pressure chambers and contains a brake fluid. Reference numeral 14 designates a brake lever switch or brake lamp switch (denoted in the drawings by "BLS") adapted to detect whether the brake foot pedal 10 is depressed or released. The brake lever switch 14 is in its on state when the brake foot pedal 10 is depressed and is in its off state when the brake foot pedal 10 is released.

A fluid passage 16 is connected to the reservoir tank 13. A pump 17 is connected to the fluid passage 16 to withdraw the brake fluid from the reservoir tank 16. An accumulator 18 (or a source of fluid pressure) is also connected to the fluid passage 16 to receive the brake fluid as pumped from the pump 17 and build up brake fluid pressure. Four fluid passages 20a to 20d are branched from the fluid passage 16 downstream of the accumulator 18. Four electrical fluid pressure control valves 21a to 21d are connected to the fluid passages 20a to 20d, respectively.

These four electrical fluid pressure control valves (hereinafter, simply referred to as "fluid pressure control valves) 21a to 21d receive the brake fluid pressure from the accumulator 18 and feed controlled brake fluid pressure to fluid passages 22a to 22d, respectively. To return the brake fluid from the fluid passages 22a to 22d to the fluid passage 16, four fluid passages 23a to 23d are connected to the respective fluid pressure control valves 21a to 21d. These fluid passages 23a to 23d are also connected to a common fluid passage 24 which is, in turn, connected to the fluid passage 16 between the pump 17 and the reservoir tank 13.

Four electrical switch valves 26a to 26d are connected to the respective fluid passages 22a to 22d. The electrical switch valve 26a is connected through a fluid passage 27a to a wheel cylinder 28a for the left rear wheel of a vehicle. Similarly, the electrical switch valve 26b is connected through a fluid passage 27b to a wheel cylinder 28b for the right rear wheel. The electrical switch valve 26c is connected through a fluid passage 27c to a wheel cylinder 28c for the left front wheel. The electrical switch valve 26d is connected through a fluid passage 27d to a wheel cylinder 28d for the right front wheel.

Four fluid passages 29a to 29d are connected to the electrical switch valves 26a to 26d, respectively. The fluid passages 29a and 29d are also connected to a common fluid passage 30 which is, in turn, connected to one of the fluid pressure chambers in the tandem master cylinder 12. Similarly, the fluid passages 29b and 29c are connected to a common fluid passage 31 which is, in turn, connected to the other fluid pressure chamber. In other words, the four wheel cylinders are connected to the two fluid pressure chambers through a X-shaped connection.

The electrical switch valves (hereinafter, simply referred to as "switch valves") 26a to 26d are operable to selectively connect the wheel cylinders 28a to 28d to either the fluid pressure control valves 21a to 21d or the tandem master cylinder 12. More specifically, the switch valve 26a allows for selective connection between the wheel cylinder 28a and the fluid pressure control valve 21a and between the wheel cylinder 28a and the tandem master cylinder 12. The switch valve 26b allows for selective connection between the wheel cylinder 28b and the fluid pressure control valve 21b and between the wheel cylinder 28b and the tandem master cylinder 12. The switch valve 26c allows for selective connection between the wheel cylinder 28c and the fluid pressure control valve 21c and between the wheel cylinder 28c and the tandem master cylinder 12. The switch valve 26d allows for selective connection between the wheel cylinder 28d and the fluid pressure control valve 21d and between the wheel cylinder 28d and the tandem master cylinder 12.

Normally, the switch valves 26a to 26d are operable to provide connection between the respective fluid passages 27a to 27d and the respective fluid passages 22a to 22d and in turn, close the respective fluid passages 29a to 29d. In the event of a system failure, the switch valves 26a to 26d are activated to provide connection between the respective fluid passages 27a to 27d and the respective fluid passages 29a to 29d and in turn, close the respective fluid passages 22a to 22d.

The fluid pressure control valves 21a to 21d and the switch valves 26a to 26d are all connected to and controlled by a controller 33.

With the switch valves 26a to 26d in its normal position, the controller 33 is operable to determine a target fluid pressure based on an output signal sent from the depression sensor 11 and then, control operation of the fluid pressure control valves 21a to 21d so as to enable the wheel cylinders 28a to 28d to develop the target fluid pressure. As the fluid pressure control valves 21a to 21d are activated, fluid pressure is fed from the fluid pressure control valves 21a to 21d to the respective wheel cylinders 28a to 28d, or fluid pressure is returned from the wheel cylinders 28a to 28d to the reservoir tank 13 through the fluid pressure control valves 21a to 21d. In this way, a level of fluid pressure in the respective wheel cylinders 28a to 28d is controlled under the influence of the fluid pressure control valves 21a to 21d in response to the amount of operation of the brake foot pedal 10.

When the switch valves 26a to 26d are in their emergency position, the tandem master cylinder 12 is operable to develop brake fluid pressure in response to the amount of operation of the brake foot pedal 10. This brake fluid pressure is then transmitted to the respective wheel cylinders 28a to 28d.

Figure 2:
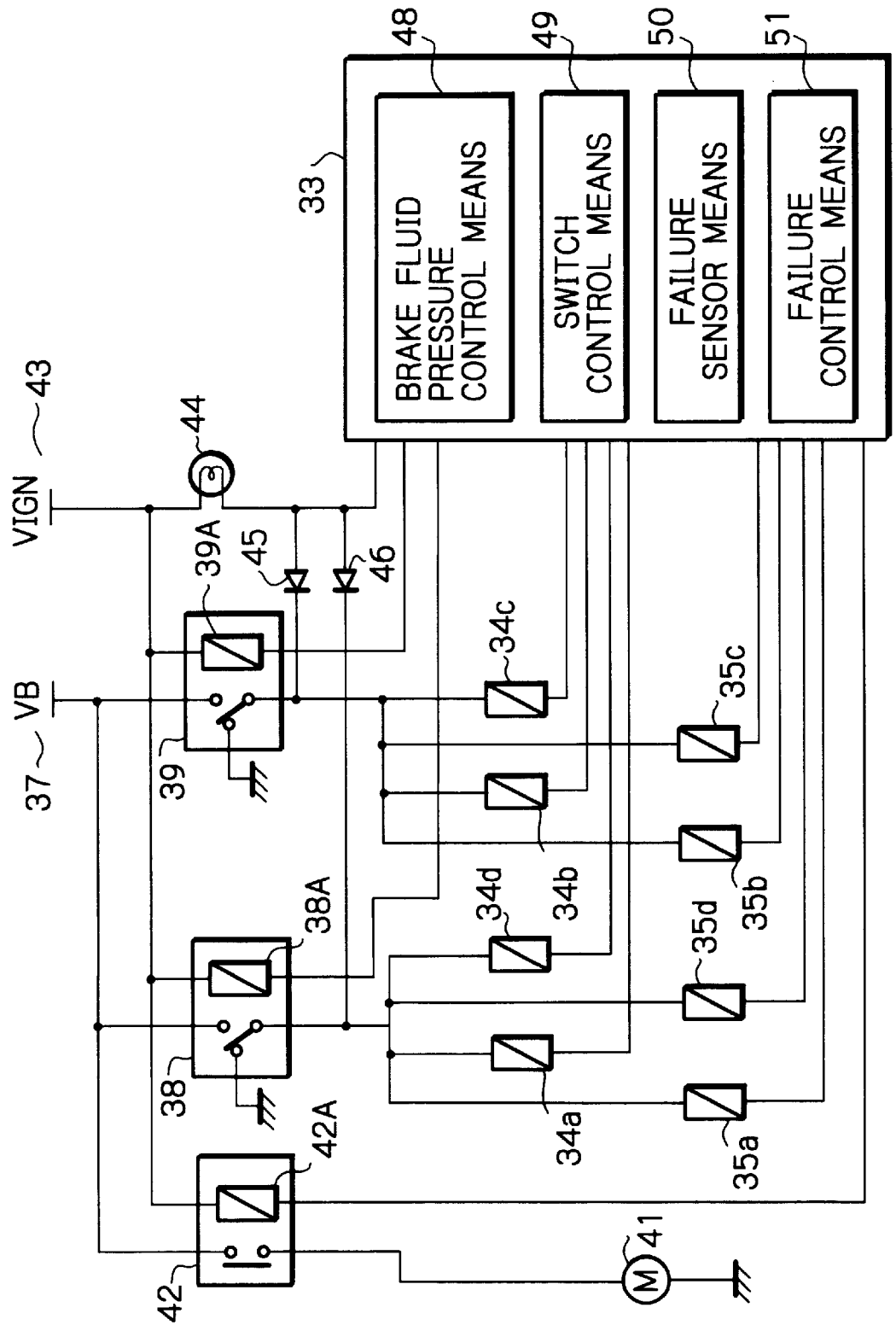
FIG. 2 is a block diagram of an electric circuit used in the vehicle brake control system shown in FIG. 1.

Referring next to FIG. 2, there is illustrated an electric circuit for use in the first embodiment.

In FIG. 2, reference numeral 34a designates a fluid pressure control valve coil adapted to activate the fluid pressure control valve 21a for the wheel cylinder 28a of the left rear wheel. Similarly, reference numeral 34b designates a fluid pressure control valve coil adapted to activate the fluid pressure control valve 21b for the wheel cylinder 28b of the right rear wheel. Reference numeral 34c designates a fluid pressure control valve coil adapted to activate the fluid pressure control valve 21c for the wheel cylinder 28c of the left front wheel. Reference numeral 34d designates a fluid pressure control valve coil adapted to activate the fluid pressure control valve 21d for the wheel cylinder 28d of the right front wheel. Reference numeral 35a designates a switch valve coil adapted to operate the switch valve 26a for the wheel cylinder 28a of the left rear wheel. Similarly, reference numeral 35b designates a switch valve coil adapted to operate the switch valve 26b for the wheel cylinder 28b of the right rear wheel. Reference numeral 35c designates a switch valve coil adapted to operate the switch valve 26c for the wheel cylinder 28c of the left front wheel. Reference numeral 35d designates a switch valve coil adapted to operate the switch valve 26d for the wheel cylinder 28d of the right front wheel.

The fluid pressure control valve 21a, the switch valve 26a, the fluid pressure control valve 21d and the switch valve 26d, that is, the fluid pressure control valve coil 34a, the switch valve coil 35a, the fluid pressure control valve coil 34d and the switch valve coil 35d collectively form a group and are connected to the power source 37 through their common power supply relay 38. Another group is comprised of the fluid pressure control valve 21b, the switch valve 26b, the fluid pressure control valve 21c and the switch valve 26c, that is, the fluid pressure control valve coil 34b, the switch valve coil 35b, the fluid pressure control valve coil 34c and the switch valve coil 35c. This group is connected to the power source 37 through their common power supply relay 39.

A drive motor 41 is energized to drive the pump 17 and is connected to the power source 37 through a power supply relay 42.

Relay coils 38A, 39A and 42A are connected to another power source 43 and adapted to render the corresponding power supply relays 38, 39 and 42 operative and inoperative.

A warning lamp 44 is also connected to the power source 43 so as to give a warning to the driver. The warning lamp 44 is typically mounted to the dashboard of a vehicle.

The fluid pressure control valve coils 34a to 34d and the switch valve coils 35a to 35d have one end connected to the power source 37 and 43 and the other end connected to a controller 33.

When electrical current from the power source 43 is caused to flow through the relay coil 38A under the control of the controller 33, the power supply relay 38 is operable to electrically connect its related coils, namely, the fluid pressure control valve coils 34a and 34d and the switch valve coils 35a and 35d, to the power source 37. If, on the other hand, the supply of electrical current is stopped, the power supply relay 38 is rendered inoperative to disconnect the fluid pressure control valve coils 34a and 34d and the switch valve coils 35a and 35d from the power source 37. Similarly, when electric current from the power source 43 is caused to flow through the relay coil 39A under the control of the controller 33, the power supply relay 39 is operable to electrically connect its related group, namely, the fluid pressure control valve coils 34b and 34c and the switch valve coils 35b and 35c, to the power source 37. If, on the other hand, the supply of electric current is stopped, the power supply relay 39 is rendered inoperative to disconnect the fluid pressure control valve coils 34b and 34c and the switch valve coils 35b and 35c from the power source 37.

Normally, with the power supply relays 38 and 39 rendered operative, the controller 33 is operable to separately control the supply or interrupt of electric current to the fluid pressure control valve coils 34a to 34d and the switch valve coils 35a to 35d.

When electric current from the power source 43 is caused to flow through the relay coil 42A under the control of the controller 33, the power supply relay 42 is rendered operative to electrically connect the drive motor 41 to the power source 37. The drive motor 41 is connected only to the power supply relay 42 rather than to all of the three power supply relays 38, 39 and 42. The drive motor 41 can thus be kept operative regardless of whether the power supply relays 38 and 39 are operative or inoperative. This arrangement enables the accumulator 18 to constantly build up or accumulate fluid pressure.

The warning lamp 44 is at all times connected to the power source 43. The warning lamp 44 is also connected to the power supply relays 38 and 39 through corresponding diodes 45 and 46. When the power supply relays 38 and 39 are rendered operative, electric current is automatically supplied to turn off the warning lamp 44. When either the power supply relay 38 or the power supply replay 39 is rendered inoperative, the supply of electric current is stopped to turn on the warning lamp 44.

The fluid pressure control valves 21a to 21d serve to provide communication between the corresponding switch valves 26a to 26d and the reservoir tank 13 when no electric current is supplied to the corresponding fluid pressure control valve coils 34a to 34d and in turn, provide communication between the accumulator 18 and the corresponding switch valves 26a to 26d when electric current is caused to flow through the fluid pressure control valve coils 34a to 34d. The switch valves 26a to 26d are in their normal position when electric current is caused to flow through the corresponding switch valve coils 35a to 35d. The switch valves 26a to 26d are in their emergency position when no electrical current is supplied to the corresponding switch valve coils 35a to 35d.

The controller 33 includes brake fluid pressure control means 48 for independently controlling the operation of the fluid pressure control valves 21a to 21d based on an output signal from the depression sensor 11, that is, the supply of electric current to the fluid pressure control valves 34a to 34d, switch control means 49 for separately controlling the operation of the switch valves 26a to 26d, that is, controlling the supply of electric current to the switch valve coils 35a to 35d, failure sensor means 50 mounted to the respective fluid pressure control valves 21a to 21d for sensing a failure in any of the fluid pressure control valves 21a to 21d, and failure control means 51 rendered operative when such a failure is sensed by the failure sensor means 50.

The failure sensor means 50 is designed to determine whether the fluid pressure control valves 21a to 21d malfunctions, by electrically sensing a failure in the fluid pressure control valve coils 34a to 34d. Such a sensor is disclosed in, for example, Japanese laid-open patent publication No. 6-135316.

If a failure occurs in any one of the fluid pressure control valves 21a to 21d, the failure control means 51 serves to render inoperative only a corresponding one of the power supply relays 38 and 39.

If, for example, the power supply replay 38 is rendered inoperative, electrical current is no longer fed to the switch valves 26a and 26d. The switch valves 26a and 26d then cause the wheel cylinders 28a and 28d to be connected to the tandem master cylinder 12. If, on the other hand, the power supply relay 39 is rendered inoperative, no electrical current is fed to the switch valves 26b and 26c. The switch valves 26b and 26c then cause the wheel cylinders 28b and 28c to be connected to the tandem master cylinder 12.

In the first embodiment, when the brake foot pedal 10 is depressed, the controller 33 is operable to cause the brake fluid pressure control means 48 and the switch control means 49 to allow electrical current to flow through the fluid pressure control valve coils 34a to 34d and the switch valve coils 35a to 35d while all the power supply relays 38, 39 and 42 are rendered operative. The fluid pressure control valve coils 34a to 34d are then operable to independently activate the fluid pressure control valves 21a to 21d, and the switch valve coils 35a to 35d are operable to place the switch valves 26a to 26d in their normal position. Under the circumstances, independently controlled brake fluid pressure is fed from the accumulator 18 to the respective wheel cylinders 28a to 28d for application of a braking force.

When the brake foot pedal 10 is released, then the controller 33 causes the brake fluid pressure control means 48 and the switch control means 49 to interrupt the flow of electrical current to the fluid pressure control valve coils 34a to 34d so as to deactivate the fluid pressure control valves 21a to 21d while all the power supply relays 38, 39 and 42 are rendered operative. The brake fluid pressure is then returned from the wheel cylinders 28a to 28d to the reservoir tank 13 through the fluid pressure control valves 21a to 21d. At this time, the flow of electric current through the switch valve coils 35a to 35d remains.

If, for example, a grounding or other electrical failure occurs at the fluid pressure control valve 21a, the controller 33 is operable under the influence of the failure sensor means 50 so as to interrupt the flow of electrical current to the power supply replay 38 for the group to which the fluid pressure control valve 21a belongs. As the power supply relay 38 is rendered inoperative, electrical current is no longer fed to the fluid pressure control valve coils 34a and 34b and the switch valve coils 35a and 35d. The fluid pressure control valves 21a to 21d are then activated to interrupt the transmission of brake fluid pressure to the switch valves 26a and 26d, whereas the switch valves 26a and 26d are activated to allow for communication between the tandem master cylinder 12 and the wheel cylinders 28a and 28d. Under the circumstances, brake fluid pressure as developed in the fluid pressure chamber in the tandem master cylinder 12 in response to depression of the brake foot pedal 10 is directly transmitted to the wheel cylinders 28a and 28d for application of a braking force.

On the other hand, the controller 33 permits the flow of electrical current to the power supply relay 39 for the group to which the remaining fluid pressure control valves 21b to 21d belong. While the power supply relay 39 remains operative, electrical current is caused to flow through the switch valve coils 35b and 35c so as to place the switch valves 26b and 26c in their normal position. Under the circumstances, electrical current is fed to the fluid pressure control valve coils 34b and 34c in response to an output signal sent from the depression sensor 11 so as to activate the fluid pressure control valves 21b and 21c. Brake fluid pressure is then transmitted from the accumulator 18 to the wheel cylinders 28b and 28c for application of a braking force.

As described above, the fluid pressure control valves 21a to 21d are separated into a plurality of groups. The power supply relays 38 and 39 are operatively associated with the respective groups. The fluid pressure control valves 21a to 21d and the switch valves 26a to 26d are connected in parallel to the power source 37 through the respective power supply relays 38 and 39. If a failure in any one of the fluid pressure control valves 21a to 21d is detected by the failure sensor means 50, the failure control means 51 is operable to deactivate the power supply relay for the group to which that fluid pressure control valve belongs and keep operative the power supply relay for the group to which the other fluid pressure control valves belong.

As one of the two power supply relays 38 and 39 remains operative, a sufficient level of brake fluid pressure is fed from the accumulator to those wheel cylinders which are operatively associated with the group for that power supply relay. The other power supply relay is rendered inoperative so that fluid pressure is directly transmitted from the tandem master cylinder 12 to the other wheel cylinders.

This arrangement prevents an increase in the production cost of the system and provides a sufficient fail-safe function a when a failure in any of the fluid pressure control valves 21a to 21d occurs.

In this embodiment, the fluid pressure control valves 21a to 21d are provided with the respective failure sensor means 50. Alternatively, the failure sensor means 50 may be connected to the respective groups rather than the respective fluid pressure control valves 21a to 21d.

The connection of the tandem master cylinder 12 and the wheel cylinders 28a to 28d takes an X-shape. Alternatively, the right and left front wheels may be in communication with one of the fluid pressure chambers in the tandem master cylinder 12, and the right and left rear wheels may be in communication with the other fluid pressure chamber. In such a case, one of the two groups may be comprised of the fluid pressure control valve coils 34c and 34d and the switch valve coils 35c and 35d. The other group may be comprised of the fluid pressure control valve coils 34a and 34b and the switch valve coils 35a and 35b. The power supply relays 38 and 39 may be connected to the respective groups.

Figure 3:
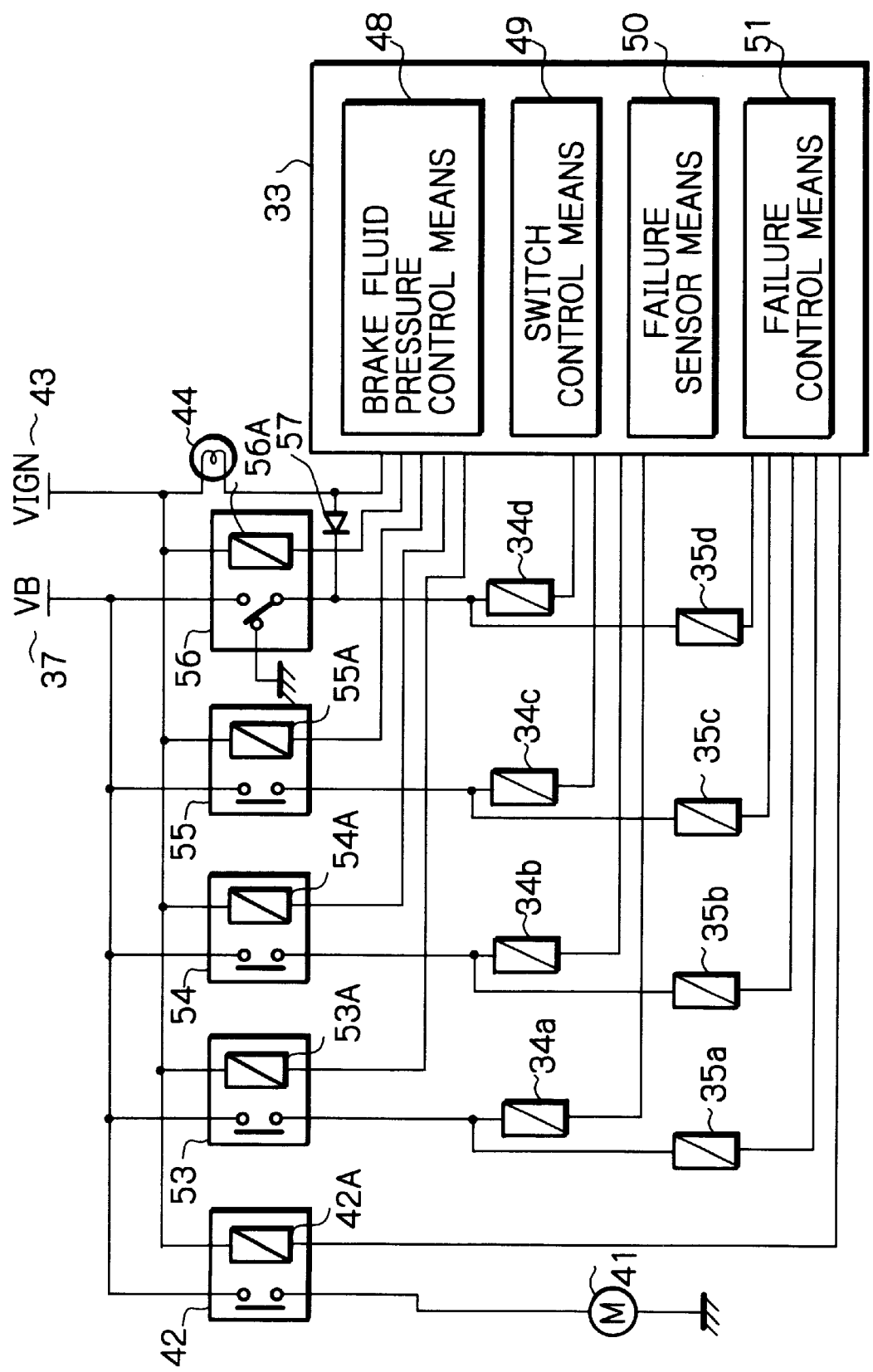
FIG. 3 is a block diagram of an electric circuit used in a vehicle brake control system according to the second embodiment of the present invention.

Turning now to FIG. 3, there is illustrated a vehicle brake control system made according to a second embodiment of the present invention. Reference will be made particularly to those which are different from the first embodiment. Like parts are given like reference numerals and will not be described herein.

As shown in FIG. 3, in the second embodiment, a power supply relay 53 is connected to the fluid pressure control valve coil 34a for the fluid pressure control valve 21a and the switch valve coil 35a for the switch valve 26a, both associated with the left rear wheel. A power supply relay 54 is connected to the fluid pressure control valve coil 34b for the fluid pressure control valve 21b and the switch valve coil 35b for the switch valve 26b, both associated with the right rear wheel. Similarly, a power supply relay 55 is connected to the fluid pressure control valve coil 34c for the fluid pressure control valve 21c and the switch valve coil 35c for the switch valve 26c, both associated with the left front wheel. A power supply relay 56 is connected to the fluid pressure control valve coil 34d for the fluid pressure control valve 21d and the switch valve coil 35d for the switch valve 26d, both associated with the right front wheel.

Relay coils 53A to 56A are connected to the power source 43 so as to render the respective power supply relays 53 to 56 operative and inoperative.

The power supply relays 53 to 56, when rendered operative, allow for the flow of electrical current through the respective fluid pressure control valve coils 34a to 34d and the respective switch valve coils 35a to 35d. The power supply relays 53 to 56, when rendered inoperative, interrupt the flow of electrical current to the respective fluid pressure control valve coils 34a to 34d and the respective switch valve coils 35a to 35d.

In this embodiment, if a failure in one of the fluid pressure control valves 21a to 21d is sensed by the failure sensor means 50, the failure control means 51 is operable to deactivate only one of the power supply relays 53 to 56 by which electrical current is fed to that fluid pressure control valve.

The warning lamp 44 is at all times connected to the power source 43. The warning lamp 44 is also connected to the power supply relay 56 through a diode 57. When the power supply relay 56 Is rendered operative, electrical current is automatically fed to turn off the warning lamp 44. When the power supply relay 56 is rendered inoperative, electrical current is automatically fed to turn on the warning lamp 44. The warning lamp 44 is turned on by the controller 33 when the other power supply relays 53 to 55 are in their inoperative state.

With this arrangement, if a failure occurs in any one of the fluid pressure control valves 21a to 21d, power supply relays other than the one that feeds electrical current to that fluid pressure control valve remain in their operative state. A sufficient level of brake fluid pressure can thus be fed from the accumulator 18 to those wheel cylinders which are operatively associated with the power supply relays in their operative state. On the other hand, brake fluid pressure is directly transmitted from the tandem master cylinder 12 to a corresponding one of the wheel cylinders.

The second embodiment may be applied to the case in which the wheel cylinders for the front wheels are communicable with one of the fluid pressure chambers in the master cylinder whereas the wheel cylinders for the rear wheels are communicable with the other fluid pressure chamber.

Figure 4:
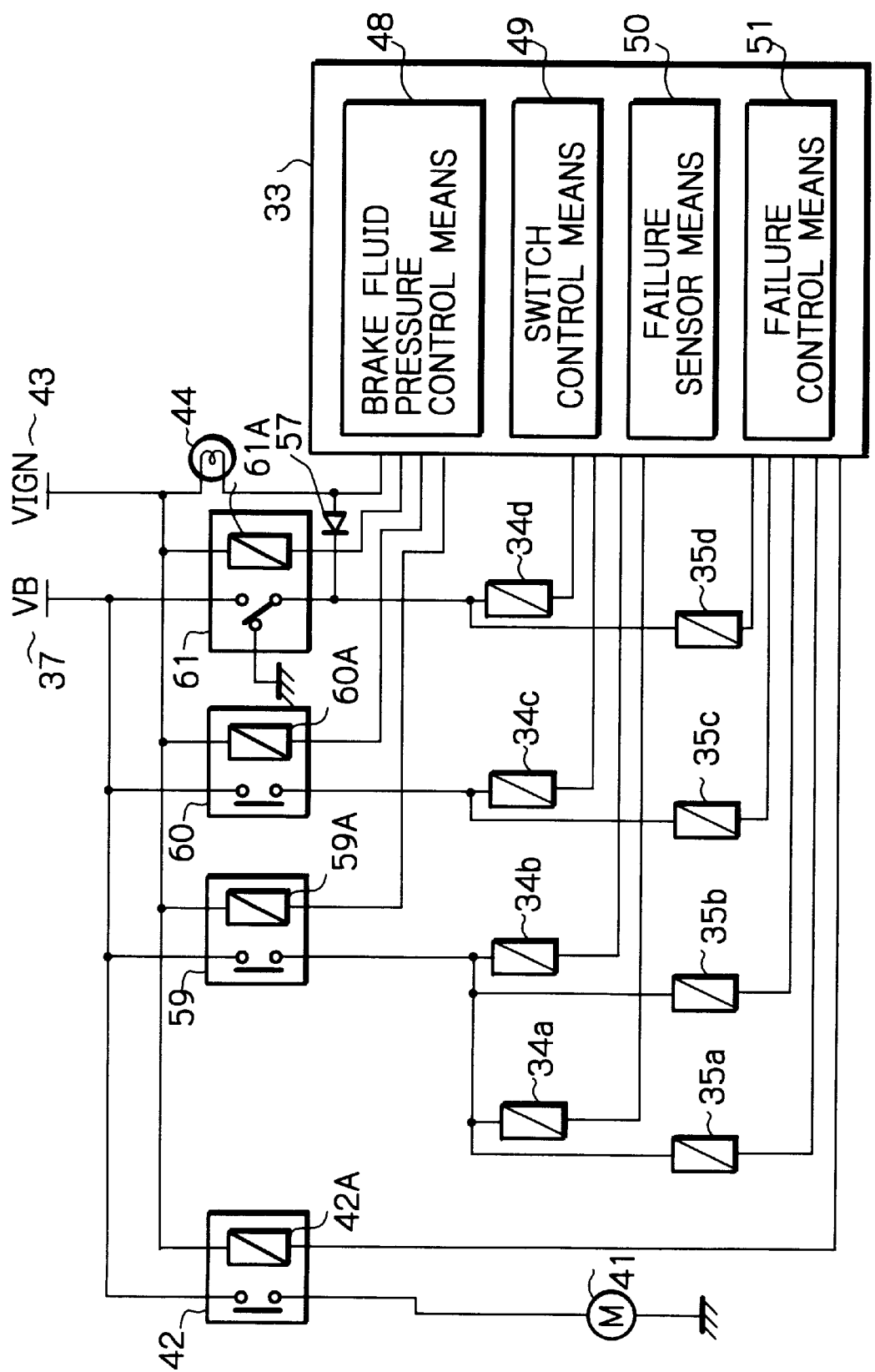
FIG. 4 is a block diagram of an electric circuit used in a vehicle brake control system according to the third embodiment of the present invention.

Referring to FIG. 4, there is illustrated a vehicle brake control system made according to a third embodiment of the present invention. Reference will be made particularly to those which are different from the first embodiment. Like parts are given like reference numerals and will not be described herein.

In the third embodiment, although not shown, the wheel cylinders for the right and left front wheels are communicated with one of the fluid pressure chambers in the tandem master cylinder 12, whereas the wheel cylinders for the right and left rear wheels are communicated with the other fluid pressure chamber.

As shown in FIG. 4, in the third embodiment, there is formed a group comprised of the fluid pressure control valve coil 34a operatively associated with the fluid pressure control valve 21a for the left rear wheel, the switch valve coil 35a for the switch valve 26a, the fluid pressure control valve coil 34b operatively associated with the fluid pressure control valve 21b for the right rear wheel, and the switch valve coil 35b for the switch valve 26b. These four coils 34a, 35a, 34b and 35b are connected to a common power supply relay 59. The fluid pressure control valve coil 34c operatively associated with the fluid pressure control valve 21c for the left front wheel and the switch valve coil 35c for the switch valve 26c are both connected to a power supply relay 60. Also, the fluid pressure control valve coil 34d operatively associated with the fluid pressure control valve 21d for the right front wheel and the switch valve coil 35d for the switch valve 26d are both connected to a power supply relay 61.

Relay coils 59A to 61A are connected to the power source 43 so as to render the respective power supply relays 59 to 61 operative and inoperative.

The power supply relays 59 to 61, when rendered operative, allow for the flow of electrical current through the respective fluid pressure control valve coils 34a to 34d and the respective switch valve coils 35a to 35d. The power supply relays 59 to 61, when rendered inoperative, interrupt the flow of electrical current to the respective fluid pressure control valve coils 34a to 34d and the respective switch valve coils 35a to 35d.

In this embodiment too, if a failure in any of the fluid pressure control valves 21a to 21d is sensed by the failure sensor means 50, then the failure control means 51 is operable to deactivate only those power supply relays by which electrical current is fed to those fluid pressure control valves.

With this arrangement, if a failure in either the fluid pressure control valve 21c for the front wheel cylinder 28c or the fluid pressure control valve 21d for the front wheel cylinder 28d occurs, a corresponding one of the power supply relays 60 and 61 is rendered inoperative. On the other hand, the other power supply relay and the power supply relay 59 for the rear wheels remain in their operative state. As such, a sufficient level of brake fluid pressure is fed from the accumulator 18 to those three wheel cylinders operatively associated with the power supply relays in their operative state.

If a failure occurs in either of the fluid pressure control valves 21a for the rear wheel cylinder 28a and the fluid pressure control valve 21b for the rear wheel cylinder 28b, the corresponding power supply relay 59 is rendered inoperative. On the other hand, the power supply relays 60 and 61 remain in their operative state. As such, a sufficient level of brake fluid pressure is fed from the accumulator 18 to the front wheel cylinders 28c and 28d for application of a braking force.

In either case, brake fluid pressure is directly fed from the tandem master cylinder 12 to one of the wheel cylinders 28a to 28d when a corresponding one of the power supply relays 59 to 61 is rendered inoperative due to a failure in a corresponding one of the fluid pressure control valves 21a to 21d.

Figure 5:
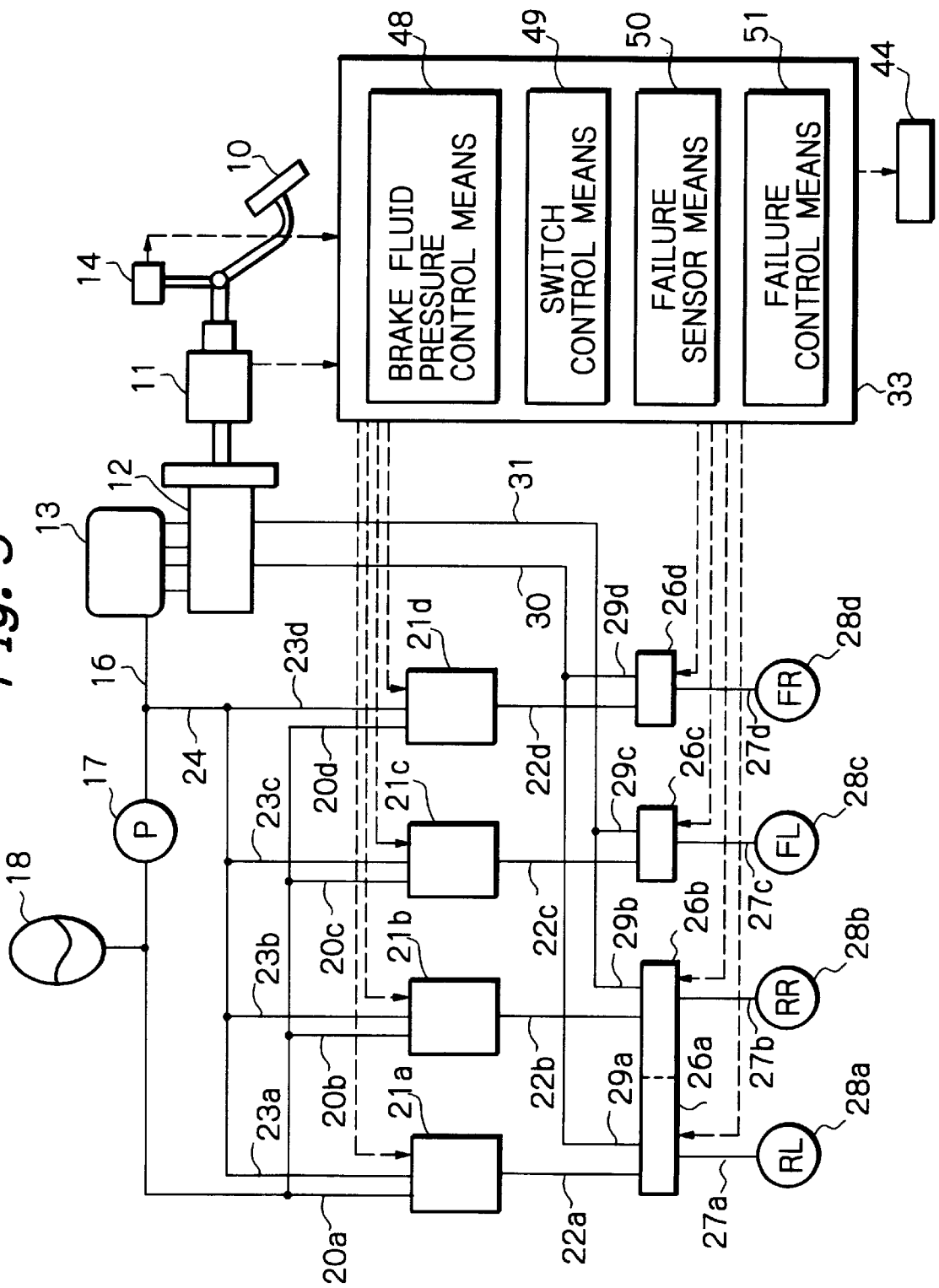
FIG. 5 is a block diagram of a pressurized fluid circuit used in a vehicle brake control system according to a fourth embodiment of the present invention.
Figure 6:
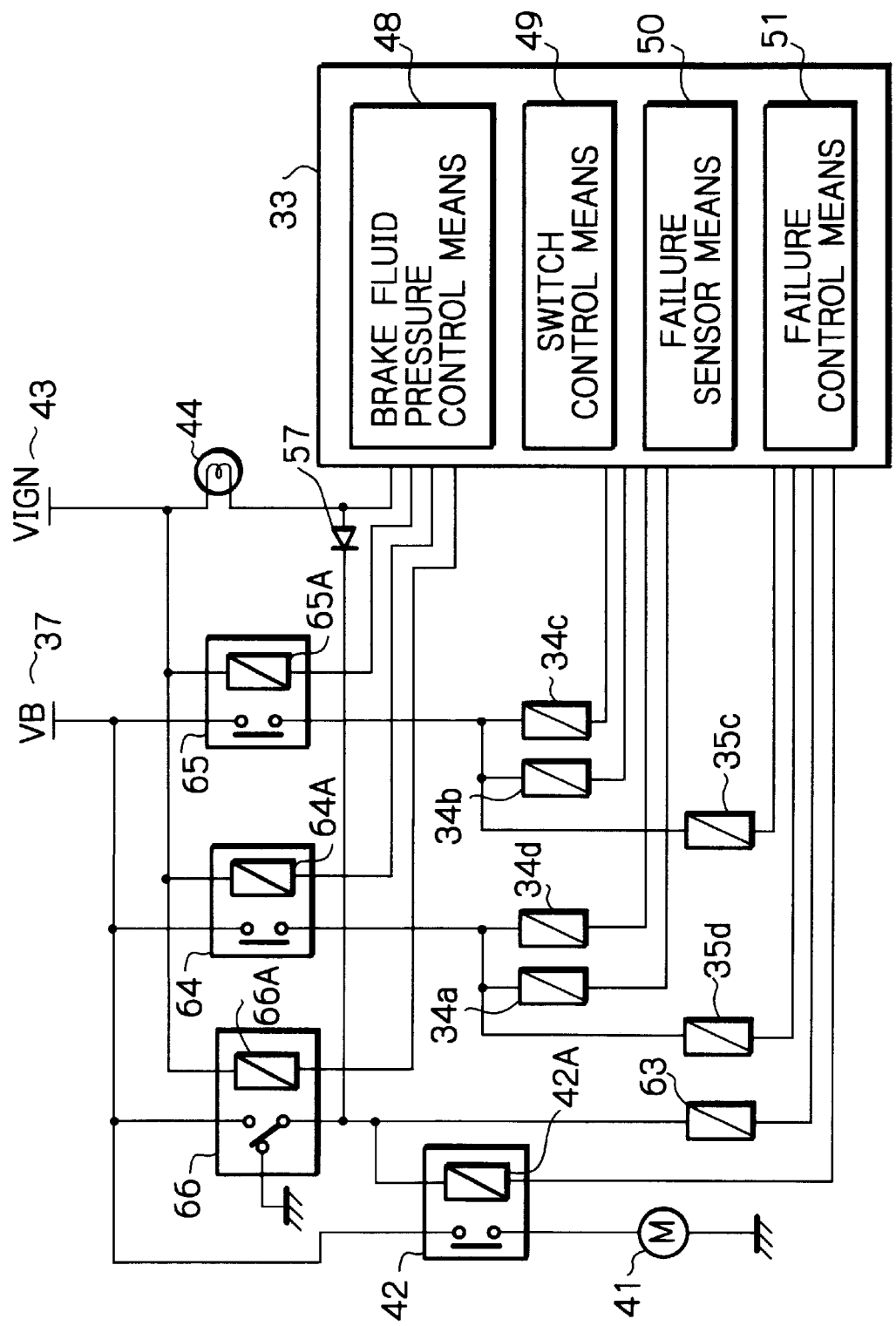
FIG. 6 is a block diagram of an electric circuit used in the vehicle brake control system shown in FIG. 5.

Referring to FIGS. 5 and 6, there is illustrated a vehicle brake control system made according to a fourth embodiment of the present invention. Reference will be made particularly to those which are different from the first embodiment. Like parts are given like reference numerals and will not be described herein.

The fourth embodiment differs from the first embodiment only in the sense that in the former, a single switch valve coil 63 is energized to simultaneously activate and deactivate the switch valve 26a operatively associated with the wheel cylinder 28a for the left rear wheel and the switch valve 26b operatively associated with the wheel cylinder 28b for the right rear wheel.

As shown in FIG. 6, in the fourth embodiment, there is formed a group comprised of the fluid pressure control valve coil 34a for the fluid pressure control valve 21a associated with the left rear wheel, the fluid pressure control valve coil 34d for the fluid pressure control valve 21d associated with the right front wheel, and the switch valve coil 35d for the switch valve 26d. These three coils 34a, 34d and 35d are connected to a common power supply relay 64. Another group is comprised of the fluid pressure control valve coil 34b for the fluid pressure control valve 21b associated with the right rear wheel, the fluid pressure control valve coil 34c for the fluid pressure control valve 21c associated with the left front wheel, and the switch valve coil 35c for the switch valve 26c. These three coils 34b, 34c and 35c are connected to a common power supply relay 65. The switch valves 26a and 26b for the rear wheels are connected to a common switch valve coil 63 which is, in turn, connected to a power supply relay 66.

Relay coils 64A to 66A are connected to the power source 43 so as to render the respective power supply relays 64 to 66 operative and inoperative.

The power supply relays 64 to 66, when rendered operative, allow for the flow of electrical current through the respective fluid pressure control valve coils 34a to 34d and the respective switch valve coils 35c and 35d. The power supply relays 64 to 66, when rendered inoperative, interrupt the flow of electrical current to these coils.

In this embodiment too, if a failure in any of the fluid pressure control valves 21a to 21d is sensed by the failure sensor means 50, then the failure control means 51 is operable to deactivate only corresponding ones of the power supply relays 64 to 66 by which electrical current is fed to those fluidpressure control valves.

With this arrangement, if a failure occurs in any of the fluid pressure control valves 21a to 21d, then power supply relays other than those which are operatively associated with those fluid pressure control valves remain operative. As such, a sufficient level of brake fluid pressure is fed from the accumulator 18 to the corresponding wheel cylinders. On the other hand, brake fluid pressure is directly fed from the tandem master cylinder to the other wheel cylinders.

Figure 7:
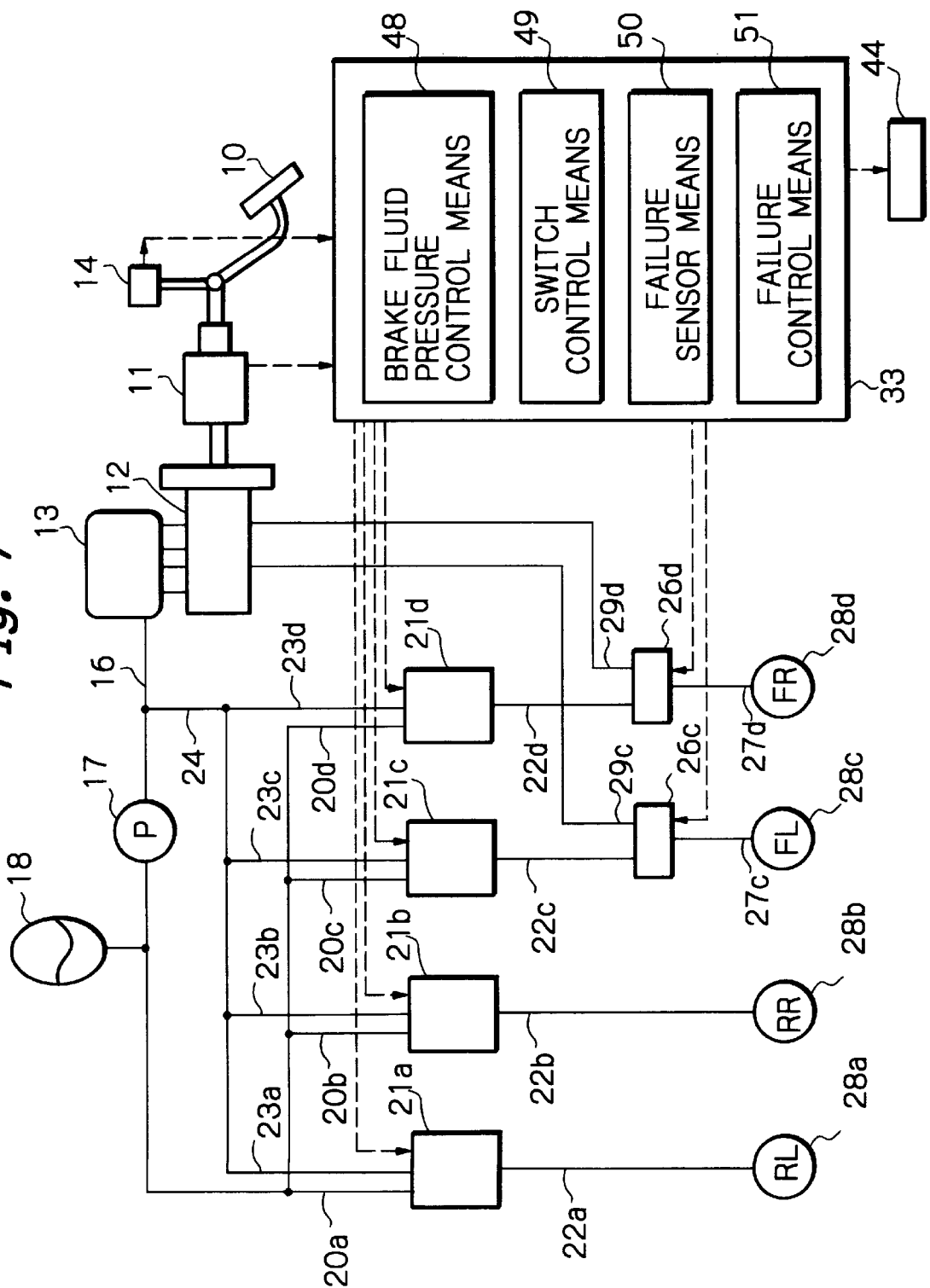
FIG. 7 is a block diagram of a pressurized fluid circuit used in a vehicle brake control system according to a fifth embodiment of the present invention.
Figure 8:
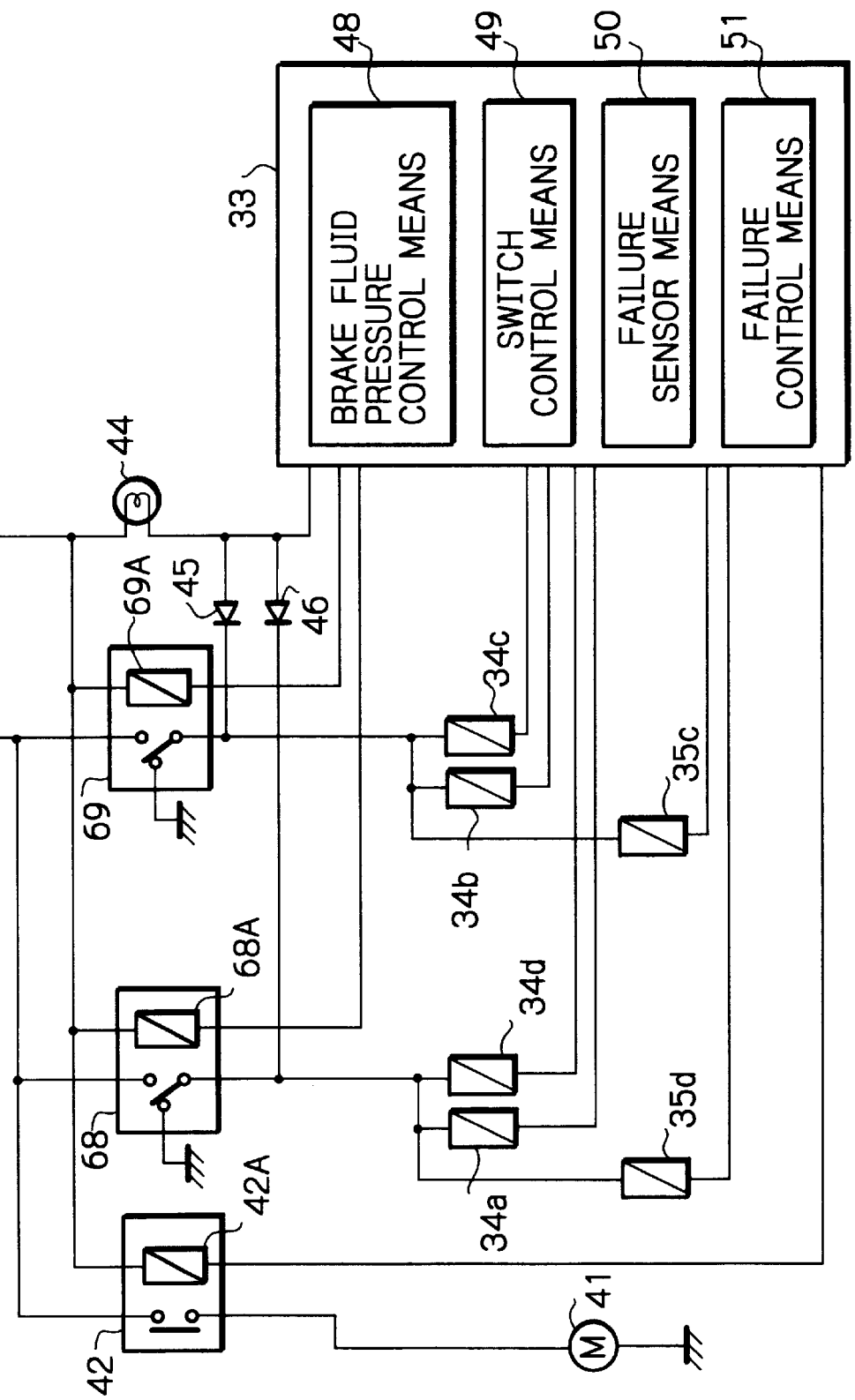
FIG. 8 is a block diagram of an electric circuit used in the vehicle brake control system shown in FIG. 7.
Figure 9:
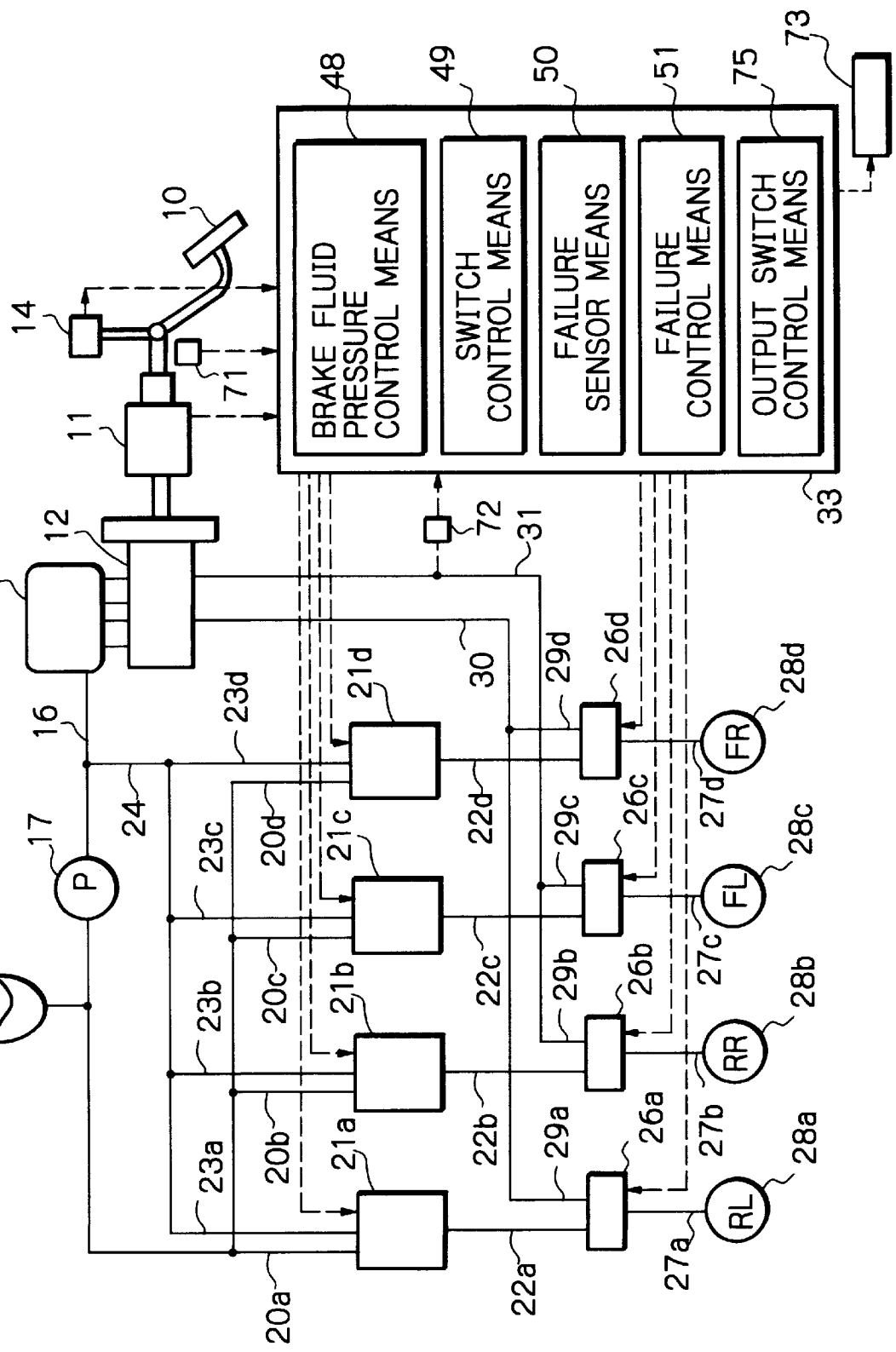
FIG. 9 is a block diagram of a pressurized fluid circuit used in a vehicle brake control system according to a sixth embodiment of the present invention.

Referring to FIGS. 7 and 8, there is illustrated a vehicle brake control system made according to a fifth embodiment of the present invention. Reference will be made particularly to those which are different from the first embodiment. Like parts are given like reference numerals and will not be described herein.

In the fifth embodiment, the wheel cylinder 28a for the left rear wheel and the wheel cylinder 28b for the right rear wheel are connected to the fluid pressure control valves 21a and 21b, but are not associated with any switch valve, as shown in FIG. 7. As such, the fluid passage 22a has one end connected to the fluid pressure control valve 21a and the other end directly connected to the wheel cylinder 28a. Similarly, the fluid passage 22b has one end connected to the fluid pressure control valve 21b and the other end directly connected to the wheel cylinder 28b. The fluid passage 29c has one end connected to the switch valve 26c and the other end directly connected to one of the fluid pressure chambers in the tandem master cylinder 12. The fluid passage 29d has one end connected to the switch valve 26d and the other end directly connected to the other fluid pressure chamber.

As shown in FIG. 8, in the fifth embodiment, there is formed a group comprised of the fluid pressure control valve coil 34a for the fluid pressure valve 21a associated with the left rear wheel, the fluid pressure control valve coil 34d for the fluid pressure control valve 21d associated with the right front wheel, and the switch valve coil 35d for the switch valve 26d. These three coils 34a, 34d and 35d are connected to a common power supply relay 68. Another group is comprised of the fluid pressure control valve coil 34b for the fluid pressure control valve 21b associated with the right rear wheel, the pressure control valve coil 34c for the pressure control valve 21c associated with the left front wheel and the switch valve coil 35c for the switch valve 26c. These coils 34b, 34c and 35c are connected to a common power supply relay 69.

Relay coils 68A and 69A are connected to the power source 43 so as to render the respective power supply relays 68 and 69 operative and inoperative.

The power supply relays 68 and 69, when rendered operative, allow for the flow of electrical current through the respective fluid pressure control valve coils 34a to 34d and the respective switch valve coils 35a to 35d. The power supply relays 68 and 69, when rendered inoperative, interrupt the flow of electrical current to the respective fluid pressure control valve coils 34a to 34d and the respective switch valve coils 35a to 35d.

In this embodiment too, if a failure in any one of the fluid pressure control valves 21a to 21d is sensed by the failure sensor means 50, then the failure control means 51 is operable to deactivate only a corresponding one of the power supply relays 68 and 69.

With this arrangement, if a failure occurs in any of the fluid pressure control valves 21a to 21d, then one of the power supply relays 68 and 69 which is not associated with those fluid pressure control valves remain operative. As such, a sufficient level of brake fluid pressure is fed from the accumulator 18 to two of the wheel cylinders. On the other hand, brake fluid pressure is directly fed from the tandem master cylinder to the other two wheel cylinders associated with the other power supply relay.

Referring to FIGS. 9 to 13, there is illustrated a vehicle brake control system made according to a sixth embodiment of the present invention. Reference will be made particularly to those which are different from the first embodiment. Like parts are given like reference numerals and will not be described herein.

In the sixth embodiment, sensors for detecting the amount of operation of the brake foot pedal 10 include, in addition to the depression sensor 11, a stroke sensor 71 (operative amount sensor) for detecting the amount of stroke of the brake foot pedal, a master cylinder pressure sensor (operative amount sensor) 72 for detecting the level of brake fluid pressure as developed in the tandem master cylinder 12 in response to action of the brake pedal 10, and a warning unit 73 for giving a warning to the driver when a system failure occurs.

In this embodiment, the controller 33 is operable to receive an output signal from the brake lever switch (BLS) 14, and at least two output signals selected from the depression sensor 11, the stroke sensor 71 and the master cylinder pressure sensor 72 in order to monitor as to whether or not an error occurs in the detection of the amount of operation of the brake foot pedal 10.

In the following paragraphs, a sensor A corresponds to any one of the depression sensor 11, the stroke sensor 71 and the master cylinder pressure sensor 72. A sensor B corresponds to any one of these three sensors, but is different from the sensor A.

The controller 33 includes output switch control means 75 for causing the sensor A to send an output signal to the brake fluid pressure control means 48 and receiving output signals from the brake lever switch (BLS) 14 and the sensors A and B so as to determine as to whether a failure occurs in the sensor A. If occurs, the output switch control means 75 causes the sensor B to send an output signal to the brake fluid pressure control means 48. If the both sensors A and B malfunction, the output switch control means 75 determines that brake control is no longer effected and changes the switch valves 26a to 26d to their emergency position.

The brake fluid pressure control means 48 is operable to receive a signal indicative of the amount of operation of the brake foot pedal 10, determine a target fluid pressure based on that information, and control the fluid pressure control valves 21a to 21d so as to cause the wheel cylinders 28a to 28d to develop the target fluid pressure.

Reference will now be made to the flow chart of FIG. 10 wherein the main loop program is executed by the controller 33.

Control process is initiated when, for example, an ignition key is on. As shown in FIG. 10, step SA1 is first executed to set EFLAG to zero. The flag EFLAG indicates whether or not a system failure occurs. Step SA2 is then executed to set DFLAG to zero. The flag DFLAG indicates whether or not further brake control can be effected. Step SA3 determines whether EFLAG is on or set to 1. If EFLAG is not set to 1, the program proceeds to step SA4 where a determination is made as to whether or not a system failure occurs. EFLAG is on if a system failure occurs, as will be described later.

Figure 11A:
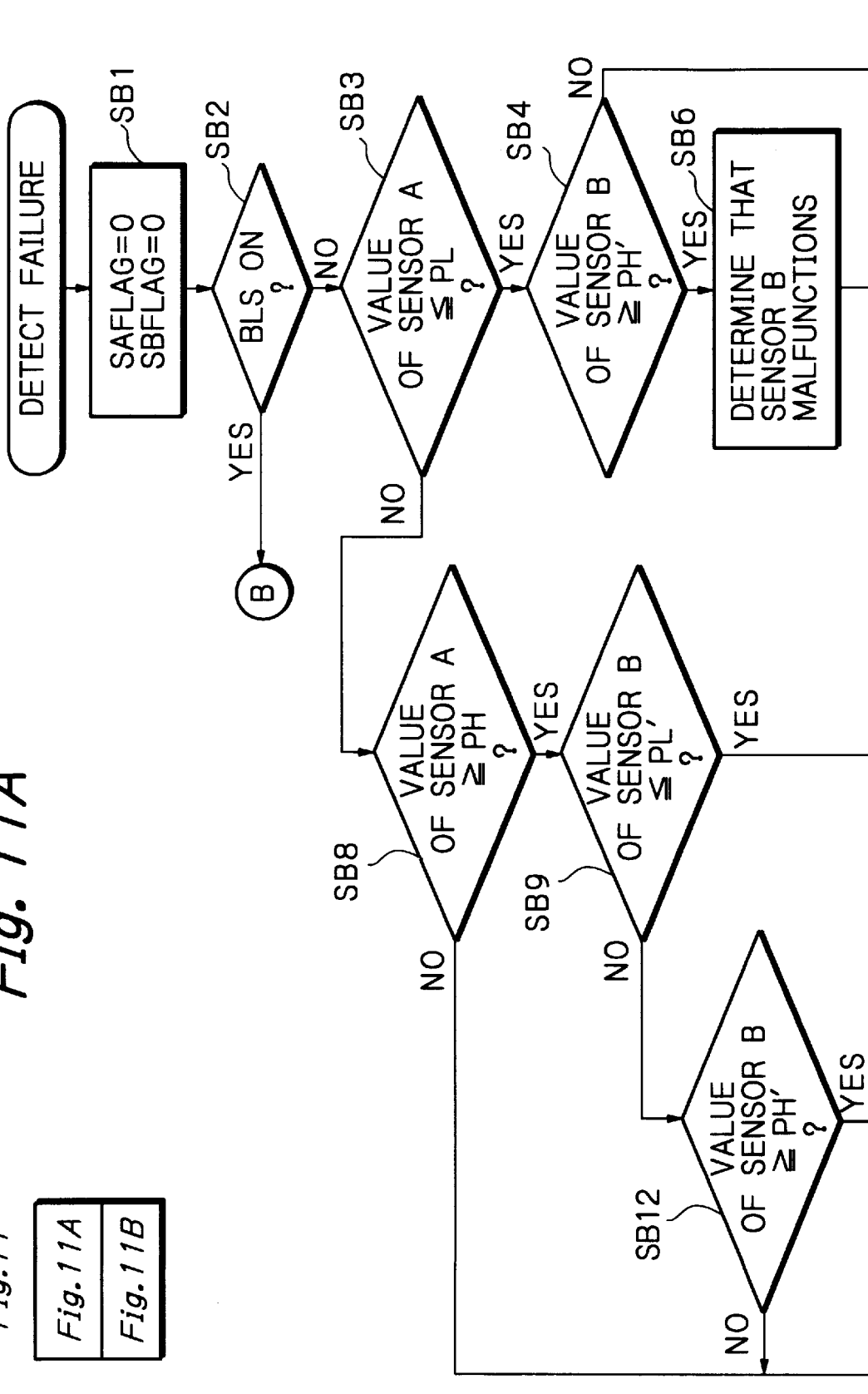
Figure 12:
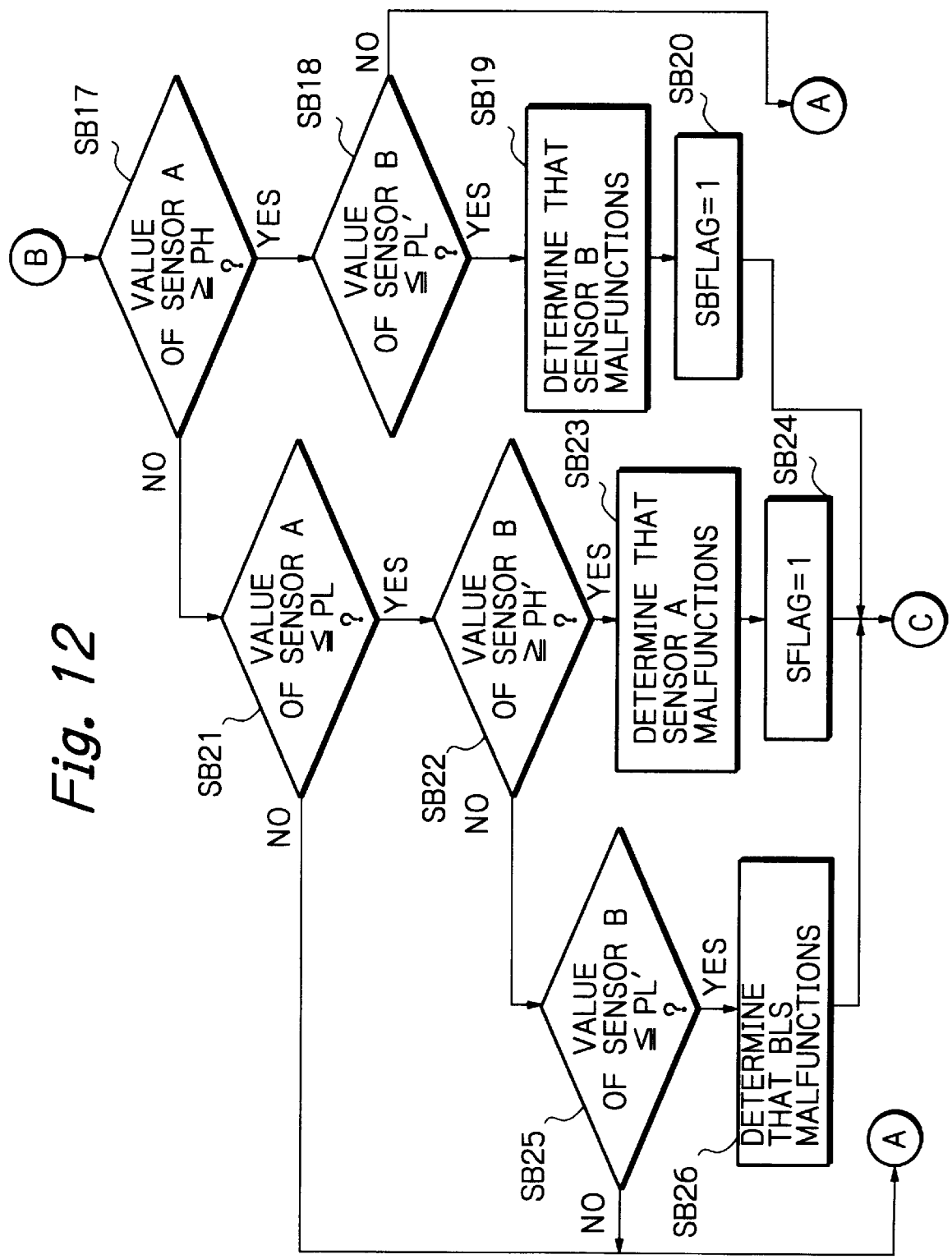
FIG. 12 is a flow chart showing another part of the control process used in the sixth embodiment of the vehicle brake control system to determine whether or not an electrical system failure occurs.

Referring specifically to FIGS. 11 and 12, step SB1 is executed to set both SAFLAG and SBFLAG to zero. The flag SAFLAG indicates whether the sensor A malfunctions. The flag SBFLAG indicates whether the sensor B malfunctions.

Next, in step SB2, a determination is made as to whether the brake lever switch 14 is on or off. If the brake lever switch 14 is off, then step SB3 and subsequent steps are executed to determine whether or not a failure occurs in the sensor A, the sensor B and the brake lever switch 14.

More specifically, step SB3 determines whether the value of an output signal from the sensor A is equal to or less than an upper limit value PL of the range which surely determines absence of brake operation. If the answer to this question is "yes", it is determined that the brake is not operated. The off state of the brake lever switch 14 and the value of the sensor A both indicate that the brake is not operated. Thus, no failure is found to occur in the brake lever switch 14 and the sensor A. Step SB4 is then executed to determine whether or not the value of an output signal from the sensor B is equal to or greater than a lower limit value PH' of the range which surely determines presence of brake operation. If the answer to this question is "no", it is determined that the brake is not operated. The off state of the brake lever switch 14 and the value of the sensor A both indicate that the brake is not operated. Thus, no failure is found to occur in the sensor B. In step SB5, a timer counter is set to zero to complete the process of step SA4. Turning to Step SB6, a determination is made as to whether or not the sensor B malfunctions. If the value of the sensor B is equal to or greater than the lower limit value PH', it is determined that the brake is operated. However, the off state of the brake lever switch 14 and the value of the sensor A both indicate that the brake is not operated. This means that the sensor B malfunctions (see step SB6). SB7 is then executed to set SBFLAG to 1.

In step SB3, if the value of the sensor A is not equal to or less than the upper limit value PL, then step SB8 is executed to determine whether or not the value of the sensor A is equal to or greater than a lower limit value PH of the range which surely determines presence of brake operation. If the answer to this question is "no", it is determined that the brake is not operated. The off state of the brake lever switch 14 and the value of the sensor A both indicate that the brake is not operated. Thus, no failure is found to occur in the brake lever switch 14 and the sensor A. Following this step, the program proceeds to step SB5. If, on the other hand, the value of the sensor A is equal to or greater than the lower limit value PH, then step SB9 is executed to determine as to whether or not the value of the sensor B is equal to or less than an upper limit value PL' of the range which surely determines absence of brake operation. If the answer to this question is "yes", it is determined that the brake is not operated. Thus, the off state of the brake lever switch 14 and the value of the sensor B both indicate that the brake is not operated. However, the value of sensor A indicates brake operation. It is then determined, in step SB10, that a failure occurs in the sensor A. Following this step, the process is continued with step SB11 where SAFLAG is set to on or 1 to indicate that a failure occurs in the sensor A.

In step SB9, if the value of the sensor B is not equal to or less than the upper limit value PL', step SB12 is executed to determine whether or not the value of the sensor B is equal to or greater than the lower limit value PH'. If the answer to this question is "yes", it is determined that the brake is operated. SB13 is then initiated to indicate that the brake lever switch 14 malfunctions. This is because the brake lever switch 14 is in its off state, whereas the values of the sensors A and B both indicate that the brake is operated. If, on the other hand, the value of the sensor B is not equal to or greater than the lower limit value PH', then the program proceeds to step SB5.

Step SB14 is initiated to add 1 to the timer counter, namely, t=t+1, when in step SB7, SBFLAG is set to 1 after it is determined in step SB6 that a failure occurs in the sensor B, when in step SB11, SAFLAG is set to 1 after it is determined in step SB10 that a failure occurs in the sensor A, and when it is determined in step SB13 that a failure occurs in the brake lever switch 14. In either case, step SB15 is executed to determine whether or not the timer counter t is equal to or greater than a predetermined value T. If the timer counter t is not equal to or greater than the predetermined value T, the process of step SA4 is completed. If, on the other hand, the timer counter t is equal to or greater than the predetermined value T, then step SB16 is executed to set EFLAG to 1. This means that a system failure occurs. This cycle of failure detection process is repeatedly carried out in order to exclude external factors which may, otherwise, have an effect on the result of failure determination.

If in step SB2, the brake lever switch 14 is on, then step SB17 and subsequent steps are executed to determine whether or not a failure occurs in any of the sensor A, the sensor B and the brake lever switch 14.

Specifically, in step SB17, a determination is made as to whether the value of the sensor A is equal to or greater than the lower limit value PH. If the answer to this question is "yes", it is determined that the brake is operated. Since the brake lever switch 14 is in its on state, no failure is found to occur in the brake lever switch 14 and the sensor A. Step SB18 is then executed to determine as to whether the value of the sensor B is equal to or less than the upper limit value PL'. If the answer to this question is "no", it is determined that the brake is operated. Since the on state of the brake lever switch 14 and the value of the sensor A both indicate that the brake is operated, no failure is found to occur in the sensor B. The program then proceeds to step SB5.

In step SB18, if the value of the sensor B is equal to or less than the upper limit value PL', it is determined that the brake is not operated. However, the on state of the brake lever switch 14 and the value of the sensor A both indicate that the brake is operated. Thus, it is determined in step SB19 that a failure occurs in the sensor B. Step SB20 is then executed to set SBFLAG to 1.

In step SB17, if the value of the sensor A is not equal to or greater than the lower limit value PH, then step SB21 is executed to determine whether or not the value of the sensor A is equal to or less than the upper limit value PL. If the answer to this question is "no", it is determined that the brake is operated. Since the brake lever switch 14 is on, no failure is found to occur in the brake lever switch 14 and the sensor A. The program then proceeds to step SB5.

In step SB21, if the value of the sensor A is equal to or less than the upper limit value PL, step SB22 is executed to determine whether or not the value of the sensor B is equal to or greater than the lower limit value PH'. If the answer to this question is "yes", it is determined that the brake is operated. The brake lever switch 14 is now in its on state. It is thus determined in step SB23 that a failure occurs in the sensor A. To indicate that the sensor A malfunctions, step SB24 is initiated by setting SAFLAG to 1.

In step SB22, if the value of the sensor B is not equal to or greater than the lower limit value PH', then step SB25 is executed to determine whether or not the value of the sensor B is equal to or less than the upper limit value PL'. If the answer to this question is "yes", it is determined from the value of the sensors A and B that the brake is not operated. However, the brake lever switch 14 is in its on state. It is thus determined in step SB26 that a failure occurs in the brake lever switch 14. The program proceeds to step SB5 in the event that the value of the sensor B is not equal to or less than the upper limit value PL'.

The program proceeds to step SB14 when in step SB20, SBFLAG is set to 1 after it is determined in step SB19 that the sensor B malfunctions, when in step SB24, SAFLAG is set to 1 after it is determined in step SB23 that the sensor A malfunctions, and when it is determined in step SB26 that the brake lever switch 14 malfunctions.

Referring back to FIG. 10, in step SA3, EFLAG is set to 1 (provided that in step SB16, EFLAG is set to 1) if any failure occurs. Step SA5 is then initiated by actuating a warning device 73. The process is continued with step SA6 where a determination is made as to whether or not other sensors malfunction.

Figure 13B:
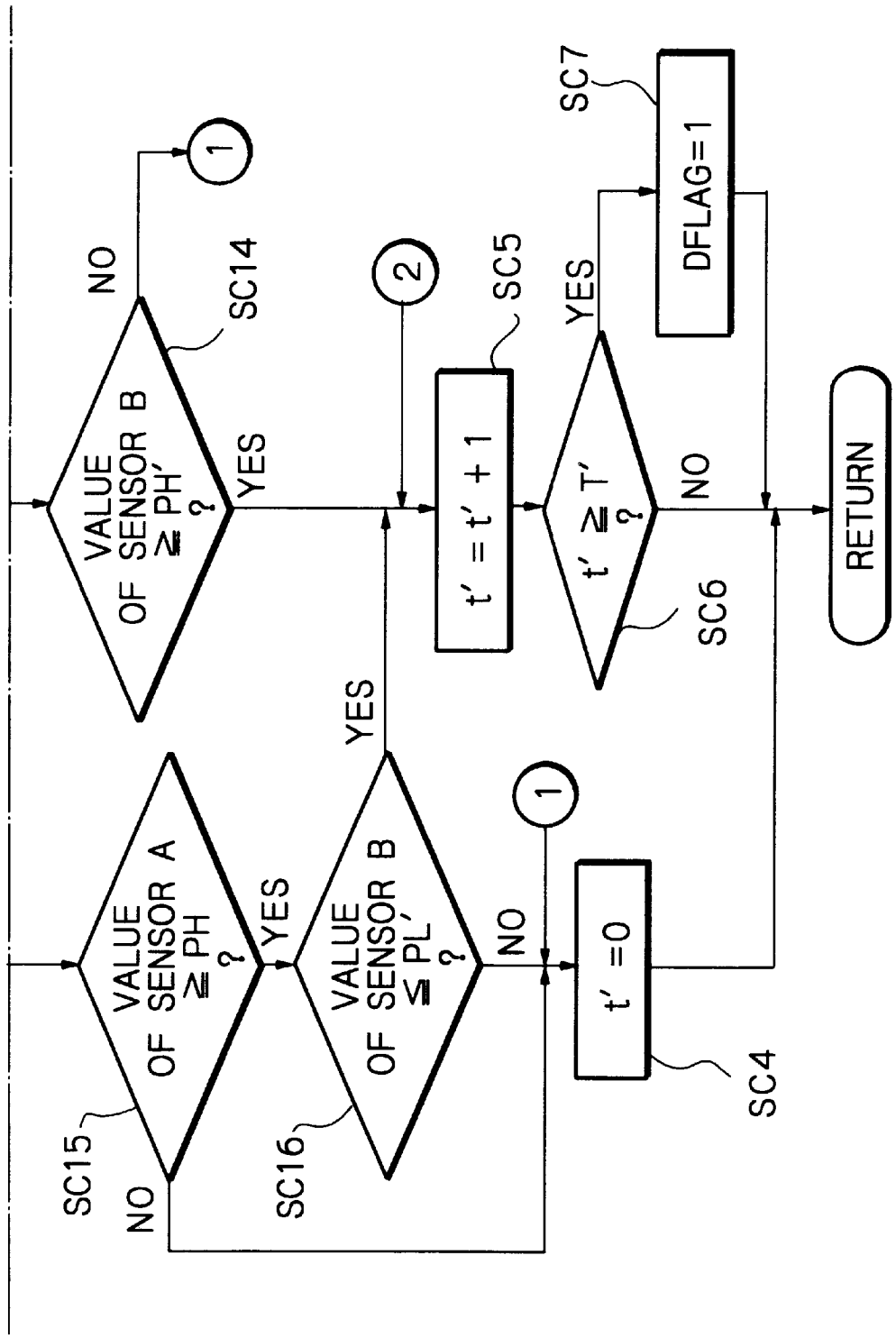

The process of Step SA6 is to detect an additional failure. Referring specifically to FIG. 13, step SC1 is first executed to determine whether or not SAFLAG is set to 1. This step is to determine whether or not in step SA4, it is decided that a failure occurs in the sensor A. If SAFLAG is 1, that is, the sensor A malfunctions, another determination is made as to whether or not any of the brake switch lever 14 and the sensor B malfunction. The value of the sensor A will not be used during this step. Now, step SC2 is executed to determine whether the brake lever switch is on or off. If the brake lever switch 14 is off, then step SC3 is executed to determine whether or not the value of the sensor B is equal to or greater than the lower limit value PH'. If the answer to this question is "no", it is determined that the brake is not operated. In this case, no failure occurs in the brake lever switch 14 and the sensor B since the brake lever switch is in its off state. Step SC4 is then executed to set the timer counter t to zero. The control process of step SA6 is now completed.

In step SC3, if the value of the sensor B is equal to or greater than the lower limit value PH', it is determined that the brake is operated. However, the brake lever switch 14 is in its off state. This means that a failure occurs in either the brake lever switch 14 or the sensor B. Step SC5 is then executed to add 1 to a timer counter t', namely t'=t'+1. In order to exclude any external factors, step SC6 is executed to determine whether or not the timer counter t' is equal to or greater than a predetermined value T'. If the answer to this question is "no", then the process of step SA6 is completed. If the answer is "yes", DFLAG is set to 1 to indicate presence of error in which the brake control cannot be continued.

If in step SC2, the brake switch lever 14 is on, then step SC8 is executed to determine whether or not the value of the sensor B is equal to or less than the upper limit value PL'. If the answer to this question is "no", it is determined that the brake is operated. Thus, no failure is found to occur in the brake switch lever 14 and the sensor B. Following this step, the program proceeds to step SC4. If, on the other hand, the value of the sensor B is equal to or less than the upper limit value PL', it is determined that the brake is not operated. Since the brake switch lever 14 is on, a failure is found to occur in either the brake switch lever 14 or the sensor B. The program then proceeds to step SC5.

If in step SC1, SAFLAG is not set to 1, that is, the sensor A properly functions, a determination is made as to whether or not a failure occurs in the other sensors and the brake switch lever 14. To this end, step SC9 is executed to determine whether or not in the process of SA4, it is determined that the sensor B malfunctions. If SBFLAG is set to 1, that is, the sensor B malfunctions, a determination is made as to whether or not the brake lever switch 14 malfunctions. The value of the sensor A is used in this determination.

In this case, step SC10 is executed to determine whether the brake lever switch 14 is on or off. If the brake lever switch 14 is off, step SC11 is executed to determine whether or not the value of the sensor A is equal to or greater than the lower limit value PH. If the answer to this question is "no", it is determined that the brake is not operated. Thus, no failure is found to occur in the brake lever switch 14 since the brake lever switch 14 is off. The program then proceeds to step SC4. If, on the other hand, the value of the sensor A is equal to or greater than the lower limit value PH, it is determined that the brake is operated. However, the brake lever switch 14 is off. Thus, it is determined that a failure occurs in the brake lever switch 14. The program then proceeds to step SC5.

If in step SC10, the brake lever switch 14 is in its on state, then step SC12 is executed to determine whether or not the value of the sensor A is equal to or less than the upper limit value PL. If the answer to this question is "no", it is determined that the brake is operated. since the brake lever switch 14 is on, no failure is found to occur in the brake lever switch 14. The program then proceeds to step SC4.

If in step SC9, SBFLAG is not set to 1, that is, the sensor B properly functions, it means the brake lever switch 14 malfunctions. Another determination is made as to whether or not a failure occurs in the sensors A and B.

Specifically, step SC13 is executed to determine whether or not the value of an output signal from the sensor A is equal to or less than the upper limit value PL. If the answer to this question is "yes", step SC14 is executed to determine whether or not the value of the sensor B is equal to or greater than the lower limit value PH'. If the answer to this question is "no", the value of the sensor A and the value of the sensor B both indicate that the brake is not operated. It means that no failure occurs in the sensors A and B. The program then proceeds to step SC4. If, on the other hand, the value of the sensor B is equal to or greater than the lower limit value PH', it is determined that the brake is operated. However, the value of the sensor A indicates that the brake is not operated. It means that a failure occurs in either the sensor A or the sensor B. Following this step, the program proceeds to step SC5.

If in step SC13, the value of the sensor A is not equal to or less than the upper limit value PL, then step SC15 is executed to determine whether or not the value of the sensor A is equal to or greater than the lower limit value PH. If the answer to this question is "no", the program proceeds to step SC4. If, on the other hand, the value of the sensor A is equal to or greater than the lower limit value PH, then step SC16 is executed to determine whether or not the value of the sensor B is equal to or less than the upper limit value PL'.

If the answer to this question is "yes", it is determined that the brake is not operated. Conversely, the value of the sensor A indicates that the brake is operated. This means that either the sensor A or the sensor B malfunctions. The program then proceeds to step SC5. If the value of the sensor B is not equal to or less than the upper limit value PL', then the program proceeds to step SC4.

Figure 10:
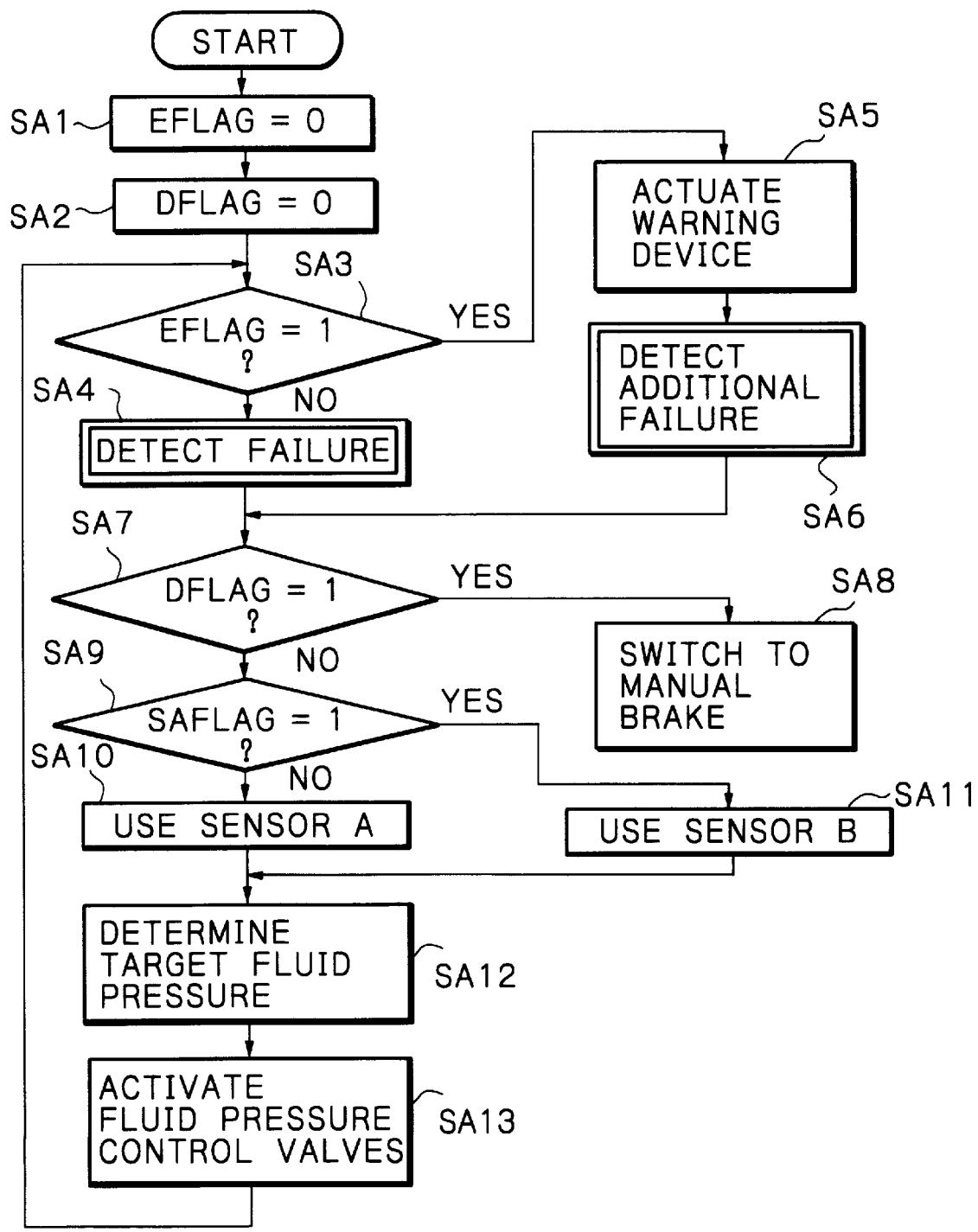
FIG. 10 is a flow chart showing a main loop program used in the vehicle brake control system shown in FIG. 9.

As shown in FIG. 10, step SA7 is executed to determine whether or not DFLAG is set to 1 after the process of step SA4 and the process of SA6 have been completed. DFLAG indicates whether or not further brake control is possible.

If DFALG is set to 1, there is a possibility that the both sensors A and B malfunction, and any further control can not be effected. Step SA8 is then initiated by switching all of the switch valves 26a to 26d to their emergency position so as to cause the driver to operate a manual brake.

If, on the other hand, DFLAG is not set to 1, then step SA9 is executed to determine whether or not SAFLAG is set to 1. If the answer to this question is "no", then the output signal of the sensor A is used to indicate the amount of operation of the brake since there occurs no failure in the sensor A. In step SA11, if the answer to this question is "yes", then the output signal of the sensor B is used since there occurs a failure in the sensor A.

Step SA12 determines a target fluid pressure based on output signals from either the sensor A or the sensor B. The process is continued with step SA13 where the fluid pressure control valves 21a to 21d are activated to cause the respective wheel cylinders 28a to 28d to develop the target fluid pressure.

In the sixth embodiment, if there is found no failure in any of the sensor A, the sensor B and the brake lever switch 14, a set of steps SB1, SB2, SB3, SB8 and SB5, a set of steps SB1, SB2, SB17, SB21 and SB5, or a set of steps SB1, SB2, SB17, SB18 and SB5 are executed during step SA4. When step SA9 is executed, SAFLAG is in no way set to 1. Thus, a decision is made to use the sensor A during step SA10.

If, on the other hand, a failure is found to occur in the sensor A, a set of SB1, SB2, SB3, SB8, SB9, SB10, and SB11 or a set of SB1, SB2, SB17, SB21, SB22, SB23 and SB24 are executed during step SA4. When step SB11 or step SB24 is executed, SAFLAG is set to 1. A decision is then made to use the sensor B during steps SA9 and SA11.

To detect the amount of operation of the brake, there are provided two sensors, sensor A and sensor B. In addition, the output switch control means 75 in the controller 33 is operable to cause the sensor A to send an output signal to the brake fluid pressure control means 48, receive output signals from the brake lever switch 14, the sensor A and the sensor B so as to determine whether or not a failure occurs in the sensor A, and cause the sensor B to send an output signal to the brake fluid pressure control means 48 if a failure occurs in the sensor A.

This arrangement provides a sufficient fail-safe function in the event of a sensor failure.

In the foregoing embodiments, the depression sensor 11, the stroke sensor 71 or the master cylinder pressure sensor 72 forms the sensor A, and either one of the other two sensors forms the sensor B. The outputs from the brake lever switch 14, the sensor A and the sensor B are used to detect a sensor failure. Alternatively, there may be employed the brake lever switch 14 and at least two different or like sensors for detecting the amount of operation of the brake. For example, there may be employed the brake lever switch 14, the depression sensor 11, the stroke sensor 71 and the master cylinder pressure sensor 72. Still alternatively, another sensor may be added to detect a sensor failure. It is also possible to employ any other sensors as far as those sensors are operable to detect the amount of operation of the brake.

The timer counters t and t' and the predetermined values T and T' are commonly used to decide that the sensor A and the sensor B malfunction. Alternatively, different timer counters and predetermined values may be used.

If it is determined that the sensor A malfunctions (SAFLAG=1), the output of the sensor A is replaced by that of the sensor B. This replacement takes place before it is finally decided that the sensor A malfunctions. Alternatively, it may take place after such a decision.

Figure 14:
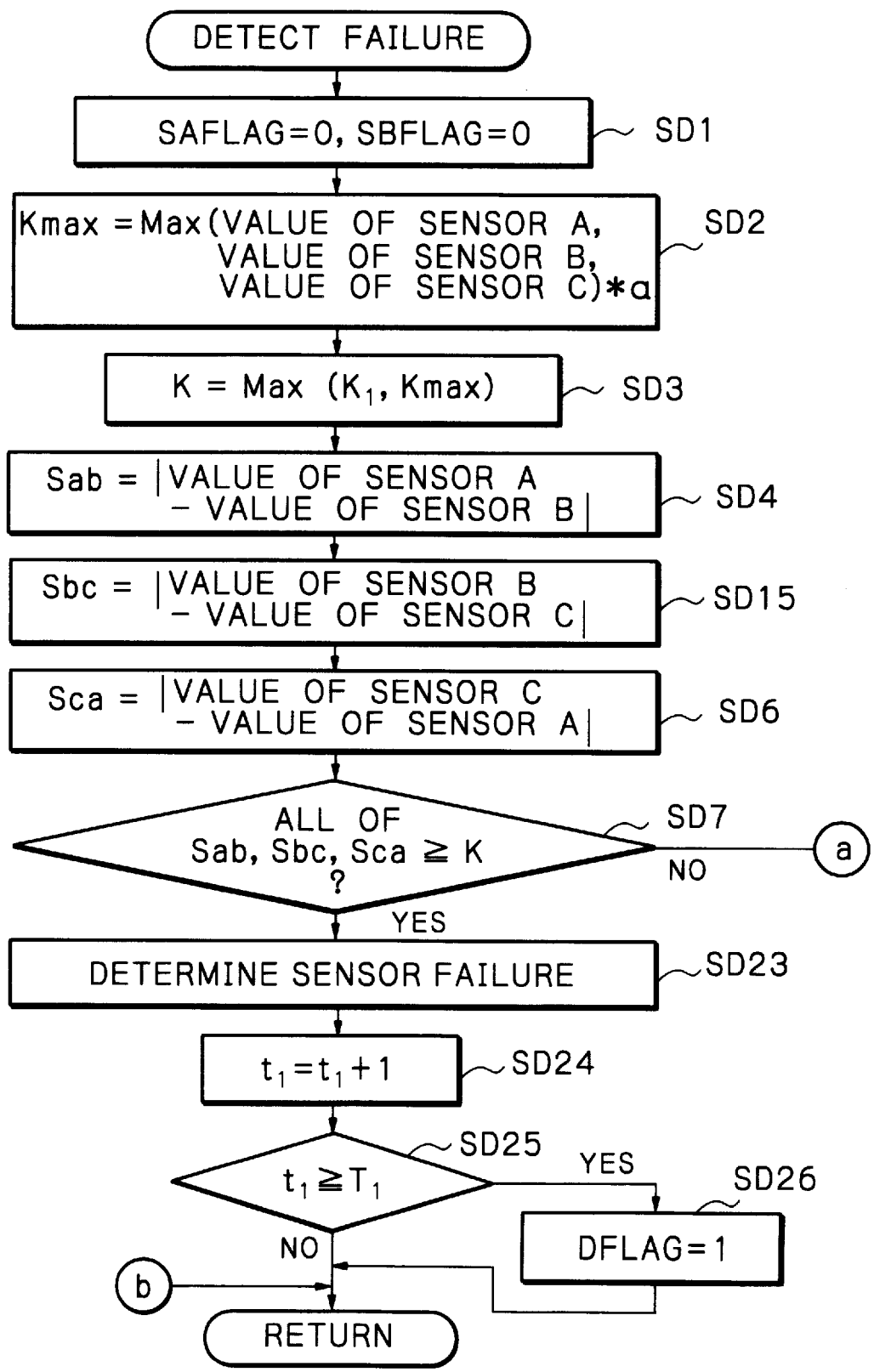
FIG. 14 is a flow chart showing a part of control process used in a vehicle brake control system according to a seventh embodiment of the present invention to determine whether or not an electrical system failure occurs.
Figure 15B:
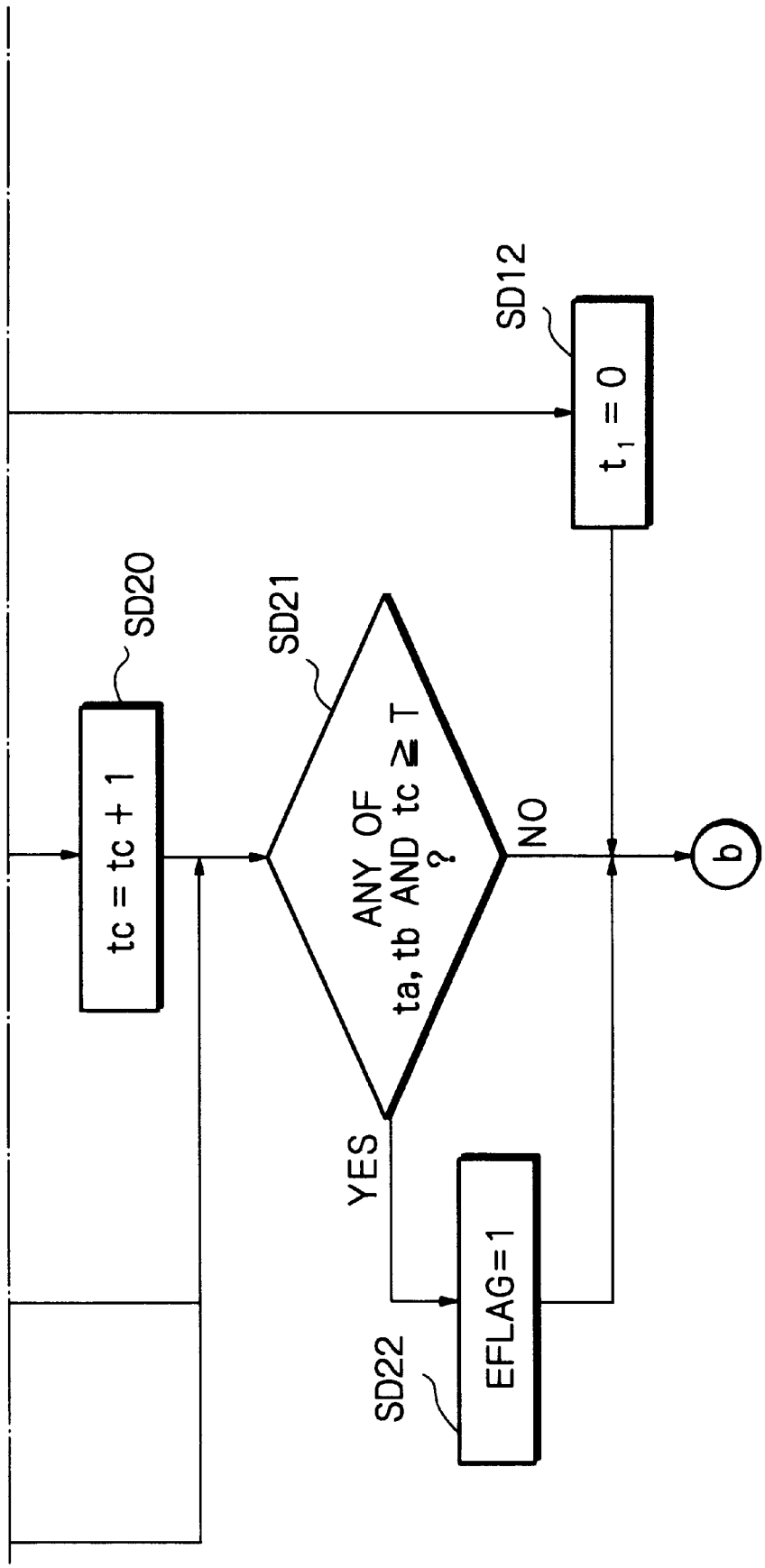
Figure 16:
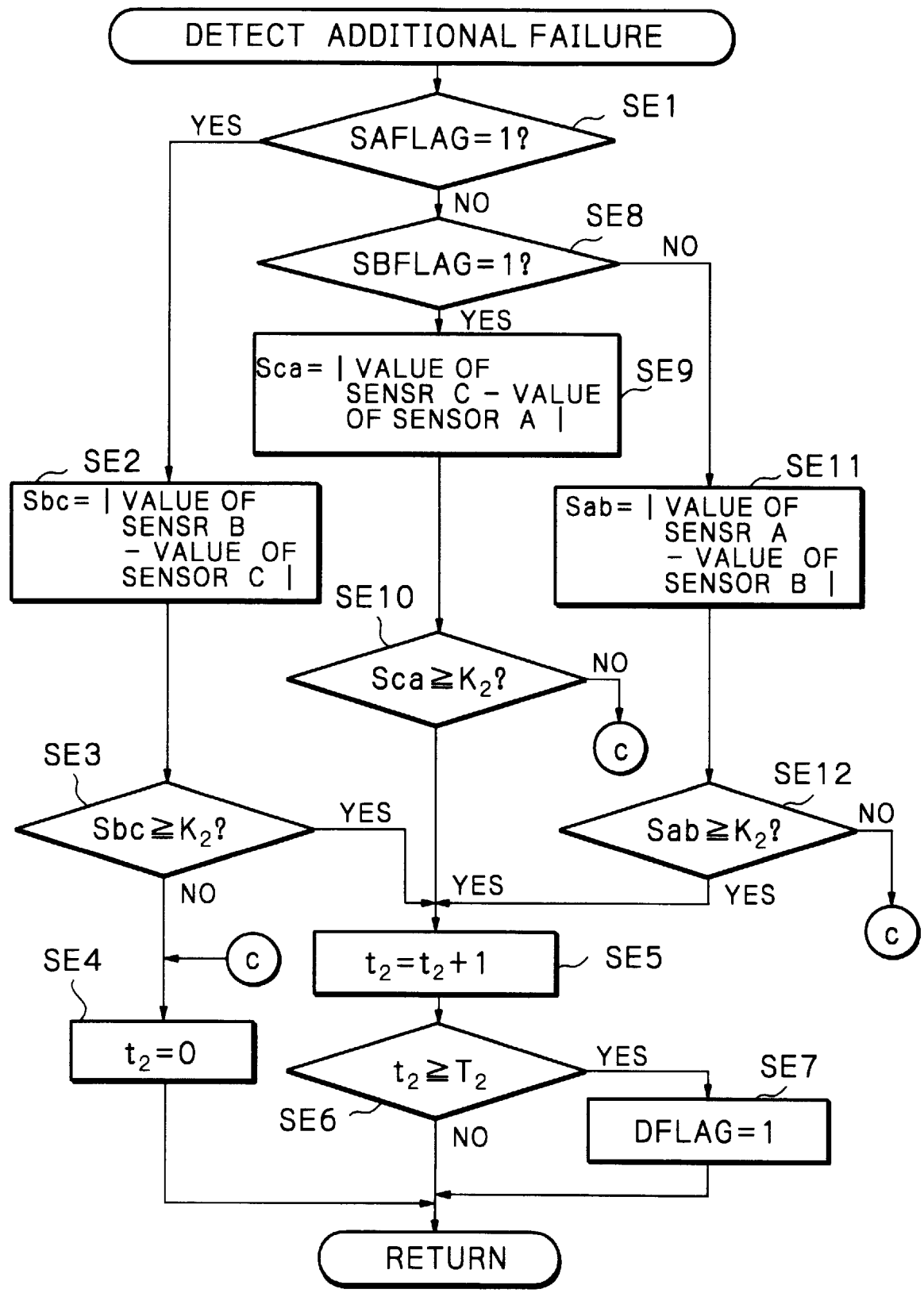
FIG. 16 is a flow chart showing control process used in the seventh embodiment of the vehicle brake control system to determine whether or not an additional electrical system failure occurs.

Referring particularly to FIGS. 14 to 16, there is illustrated a vehicle brake control system made according to a seventh embodiment of the present invention. Reference will now be made to those which are different from the sixth embodiment. Like parts are given like reference numerals and will not be described herein.

In the seventh embodiment, three output signals from the depression sensor 11, the stroke sensor 71 and the master cylinder pressure sensor 72 are employed to monitor if a failure occurs in any of the sensors.

In the following paragraphs, the depression sensor 11, the stroke sensor 71 or the master cylinder pressure sensor 72 may constitute a sensor A. Also, any one of the depression sensor 11, the stroke sensor 71 and the master cylinder pressure sensor 72 may constitute a sensor B, but the one which constitutes the sensor A is excluded. Further, any one of these three sensors may constitutes a sensor C, but those which constitute the sensors A and B are excluded.

In the seventh embodiment, the controller 33 is provided with the output switch control means 75 operative to cause the sensor A to send an output signal to the brake fluid pressure control means 48 and receive output signals from the three sensors A to C to thereby determine whether or not a failure occurs in the sensor A. If a failure is found, then the output switch control means 75 is operable to cause the sensor B to send an output signal to the brake fluid pressure control means 48. If a failure occurs in the both sensors A and B, then, the output switch control means 75 determines that no further brake control is possible. The switch valves 26a to 26d are then switched to their emergency position.

If all of the three sensors A to C properly function, then the output switch control means 75 is operable to detect a sensor failure by using slight differences in the value of output signals from the three sensors A to C.

The control process carried out by the controller 33 will now be described with reference to the flow charts of FIGS. 10 and 14 to 16.

The main loop program of the seventh embodiment is identical to that of the sixth embodiment shown in FIG. 10. However, steps in step SA4 and SA6 are different from those in the sixth embodiment. Therefore, reference will be made particularly to those steps in SA4 and SA6.

In the seventh embodiment, in step SA4, step SD1 is executed to set SAFLAG and SBFLAG to zero as shown in FIGS. 14 and 15. SAFLAG indicates as to whether a failure occurs in the sensor A. SBFLAG indicates as to whether a failure occurs in the sensor B.

Step SD2 is then executed to determine a maximum value from the value of the sensor A, the value of the sensor B and the value of the sensor C, and multiply this maximum value by a predetermined factor a so as to obtain the value Kmax. The factor a is less than 1.0, for example, 0.2 or 0.3.

Following this step, step SD3 is executed to determine a determination value k. The determination value k is the value of Kmax or a predetermined value k1 whichever is greater.

Next, step SD4 is executed to obtain an absolute value Sab of the difference between the value of the sensor A and the value of the sensor B. Similarly, step SD5 is executed to obtain an absolute value Sbc of the difference between the value of the sensor B and the value of the sensor C. Also, step SD6 is executed to obtain an absolute value Sca of the difference between the value of the sensor C and the value of the sensor A.

Following these steps, step SD7 is executed to determine whether or not all of the absolute values Sab, Sbc and Sca are equal to or greater than the determination value k. If the answer to this question is "no", then step SD8 is executed to determine whether or not the both absolute values Sab and Sca are equal to or greater than the determination value k. If the answer to this question is "no", then step SD9 is executed to determine whether or not the both absolute values Sab and Sbc are equal to or greater than the determination value k. If the answer to this question is "no", then step SD10 is executed to determine whether or not the both absolute values Sbc and Sca are equal to or greater than the determination value k. If the answer to this question is "no", it is found that no failu re occurs in any of the sensors A to C. Then, in step SD11, timer counters ta, tb, and tc are all set to zero. The process is continued with step SD12 where a timer counter t1 is also set to zero. This completes the process of step SA4.

If in step SD8, the both absolute values Sab and Sca are equal to or greater than the determination value k, it is found in step SD13 that the sensor A malfunctions. The process is continued with step SD14 where SAFLAG is set to 1. Step SD15 is then executed to add 1 to the timer counter ta, namely, ta=ta+1.

If in step SD9, the both absolute values Sab and Sbc are equal to or greater than the determination value k, it is found in step SD16 that the sensor B malfunctions. The process is continued with step SD17 where SBFLAG is set to 1. Step SD18 is then executed to add 1 to the timer counter tb, namely, tb=tb+1.

If in step SD10, the both absolute values Sbc and Sca are equal to or greater than the determination value k, it is found in step SD19 that the sensor C malfunctions. Step SD20 is then executed to add 1 to the timer counter tc, namely, tc=tc+1.

At the completion of steps SD15, SD18 and SD20, step SB21 is executed to determine whether or not any of the timer counters ta, tb and tc is equal to or greater than the predetermined value T. If the answer to this question is "no", then the process of step SA4 is completed. If, on the other hand, the answer is "yes", it is then decided that a failure occurs. Following this decision step, step SD22 is executed to set EFLAG to 1. This completes the process of step SA4.

If in step SD7, all of the absolute values Sab, Sbc and Sca are equal to or greater than the determination value k, it means that at least two of the three sensors A to C malfunction. However, it is not possible to identify the one which is properly functioning. Step SD23 determines that a failure occurs in all the three sensors A to C. Then, step SD24 is executed to add 1 to the timer counter t1, namely t1=t1+1. In step SD25, a determination is made as to whether or not the timer counter t1 is equal to or greater than a predetermined value T1. If the answer to this question is "no", the process of step SA4 is completed. If, on the other hand, the timer counter t1 is equal to or greater than the predetermined value T1, it is decided that a failure occurs. The process is continued with step SD26 where DFLAG is set to zero. It indicates that further brake control is not possible or a failure occurs in the sensors. This completes the process of SD4.

Reference will be made to the process of step SA6 in the seventh embodiment, wherein an additional failure is detected. As shown in FIG. 16, step SE1 is first executed to determine whether or not SAFLAG is set to 1. If the answer to this question is "yes", that is the sensor A malfunctions, then step SE2 is executed to obtain an absolute value Sbc of the difference between the value of the sensor B and the value of the sensor C. The process is continued with step SE3 where a determination is made as to whether the absolute value Sbc is equal to or greater than a determination value k2. If the answer to this question is "no", it is found that no failure occurs in the sensors B and C. Step SE4 is then executed to set a timer counter t2 to zero. This completes the process of step SA6. If, on the other hand, Sbc is equal to or greater than the determination value k2, it is then found that at least either the sensor B or the sensor C malfunctions. The process is continued with step SE5 where 1 is added to the timer counter t2, namely, t2=t2+1. Following this step, step SE6 is executed to determine whether or not the value of the timer counter t2 is equal to or greater than a predetermined value T2. If the answer to this question is "no", the process of step SA4 is completed. If, on the other hand, the value of the timer counter t2 is equal to or greater than the predetermined value T2, it is decided that further brake control is not possible. The process is continued with step SE7 where DFLAG is set to 1 to indicate that a failure occurs during detection step. This completes the process of SA6.

If in step SE1, SAFLAG is not set to 1, that is, the sensor A is properly functioning, then step SE8 is executed to determine whether or not SBFLAG is set to 1. If the answer to this question is "yes", that is, the sensor B malfunctions, then step SE9 is executed to obtain an absolute value Sca of the difference between the value of the sensor C and the value of the sensor A. In step SE10, a determination is made as to whether or not the absolute value Sca is equal to or greater than the determination value k2. If the answer is this question is "no", it is again found that no failure occurs in the sensors C and A. The program now proceeds to step SE4. If the absolute value Sca is equal to or greater than the determination value k2, it is found that at least either the sensor C or the sensor A malfunctions. The program then proceeds to step SE5.

In step SE8, if SBFLAG is not set to 1, that is, no failure occurs in the sensor B, then steps SE11 and SE12 are executed to determine whether or not the absolute value Sab is equal to or greater than the determination value k2. If the answer to this question is "no", it is again found that no failure occurs in the sensors A and B. The program then proceeds to step SE4. If, on the other hand, the absolute value Sab is equal to or greater than the determination value k2, it is found that at least either the sensor A or the sensor B malfunctions. The program then proceeds to step SE5.

In this embodiment, the determination value k2 is predetermined. Alternatively, the determination value k2 may be the maximum value among the values of the sensors A to C. Still alternatively, the sensors A to C may have respective determination values.

In the seventh embodiment, when no failure in the sensors A to C are found, in step SA4, steps SD1 to SD12 are executed. Then, in step SA9, SAFLAG is not found to be 1. In step 10, the sensor A is employed.

Under the circumstances, if the sensor A is found to malfunction, in step SA4, steps SD1, SD8, SD13, SD14 and SD15 are executed to detect a failure in the sensor A. In step SD14, SAFLAG is set to 1. Accordingly, in steps SA9 to SA11, the sensor B is employed.

This embodiment employs the three sensors A to C to detect the amount of operation of the brake. In addition, the output switch control means 75 in the controller 33 causes the sensor A to send an output signal to the brake fluid pressure control means 48 and is operable to receive output signals from the three sensors A to C so as to determine whether or not a failure occurs in the sensor A. If it is found that a failure occurs in the sensor A, then, the output switch control means 48 causes the sensor B to send an output signal to the brake fluid pressure control means 48.

As such, this system provides a sufficient fail-safe function in the event of a sensor failure.

Figure 17A:
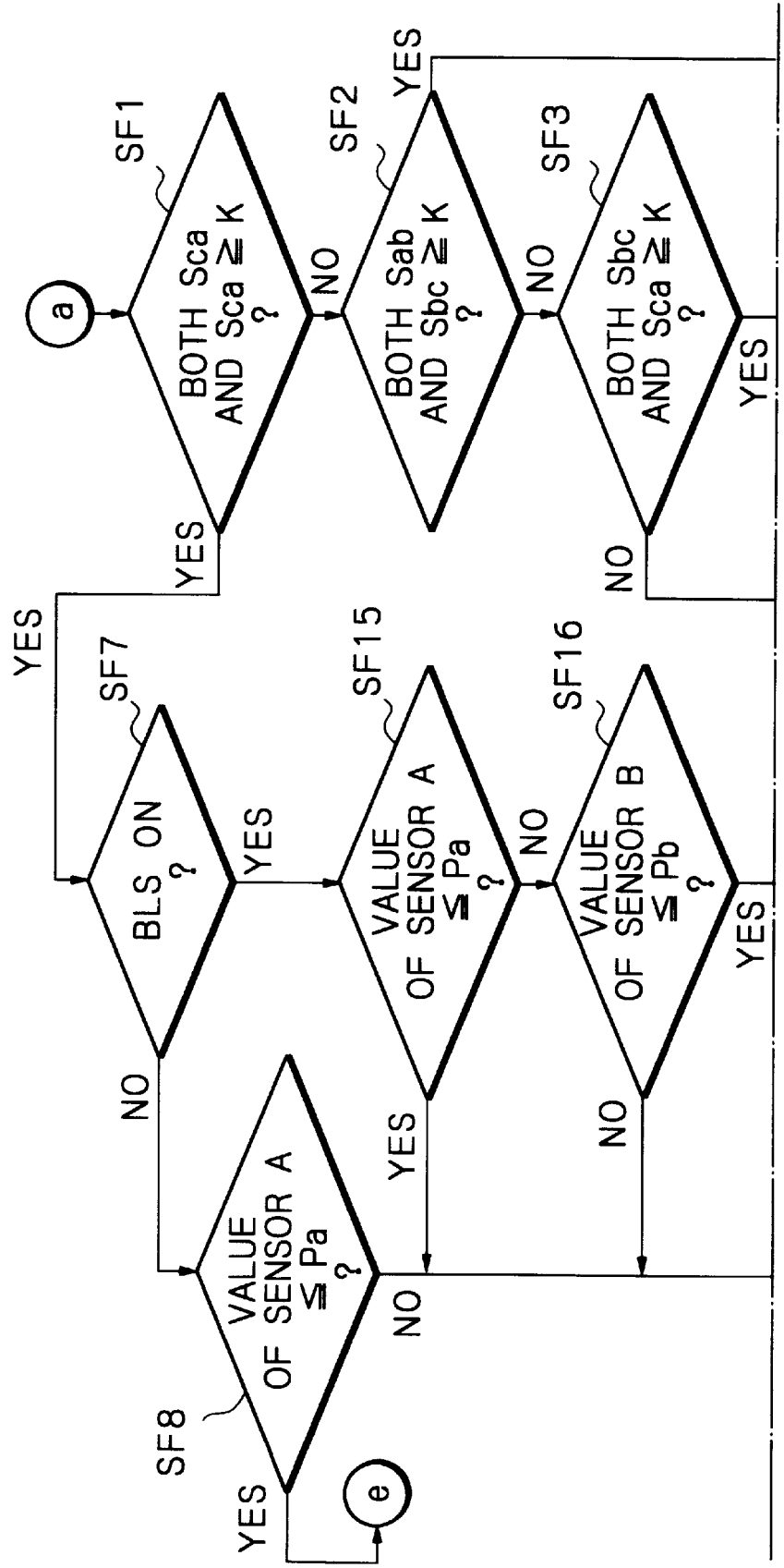
Figure 17B:
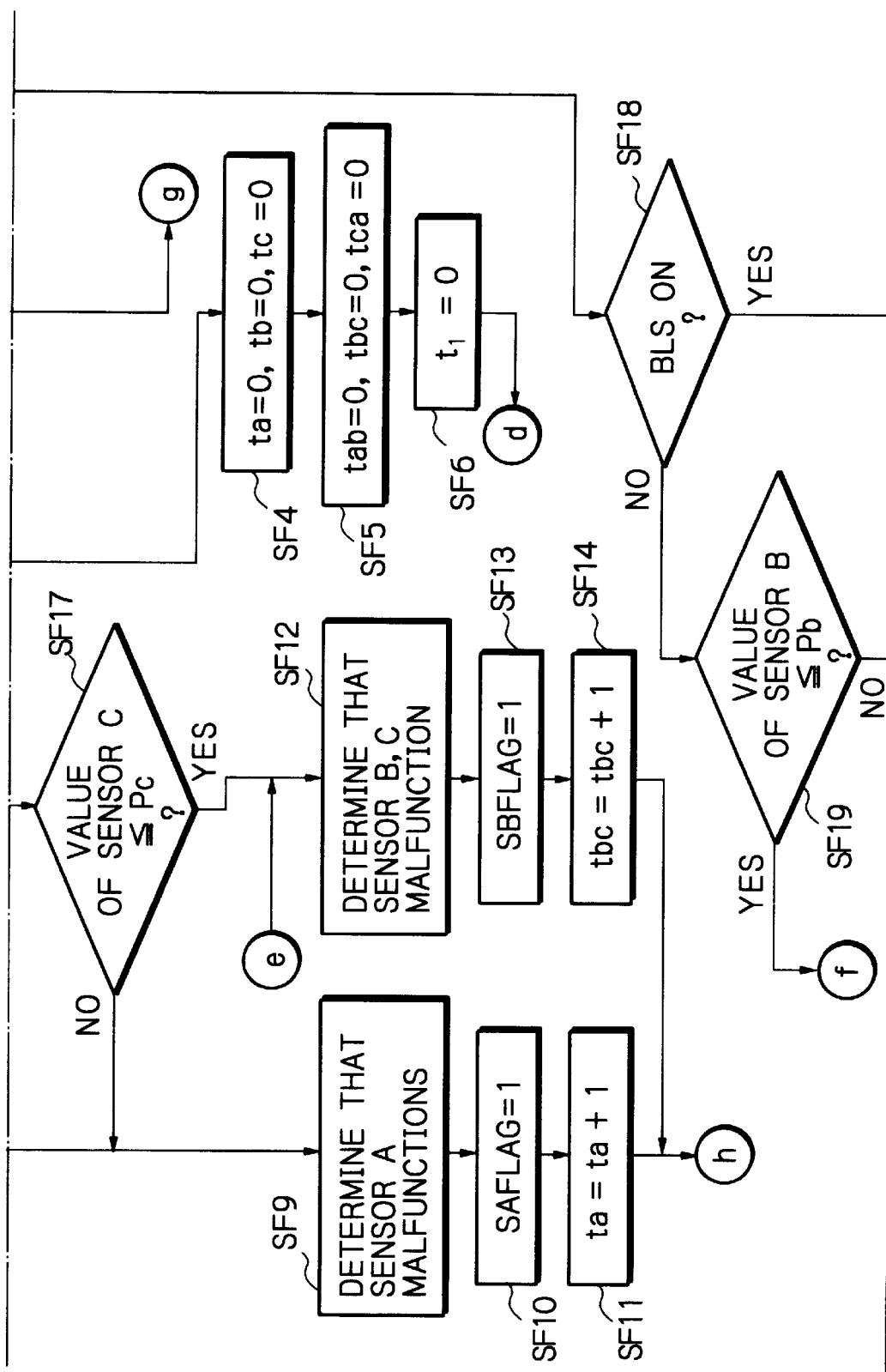
Figure 17C:
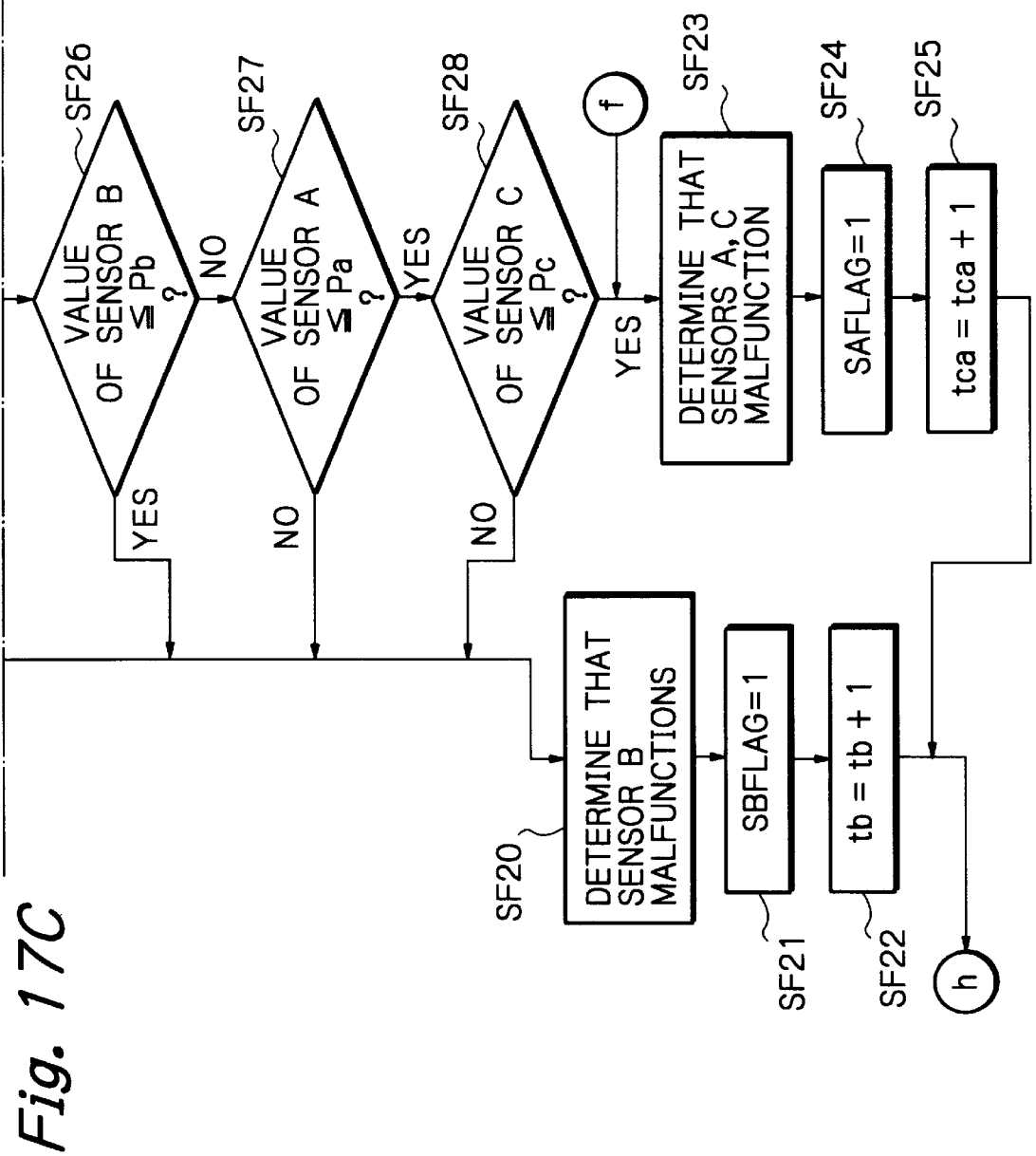
Figure 18:
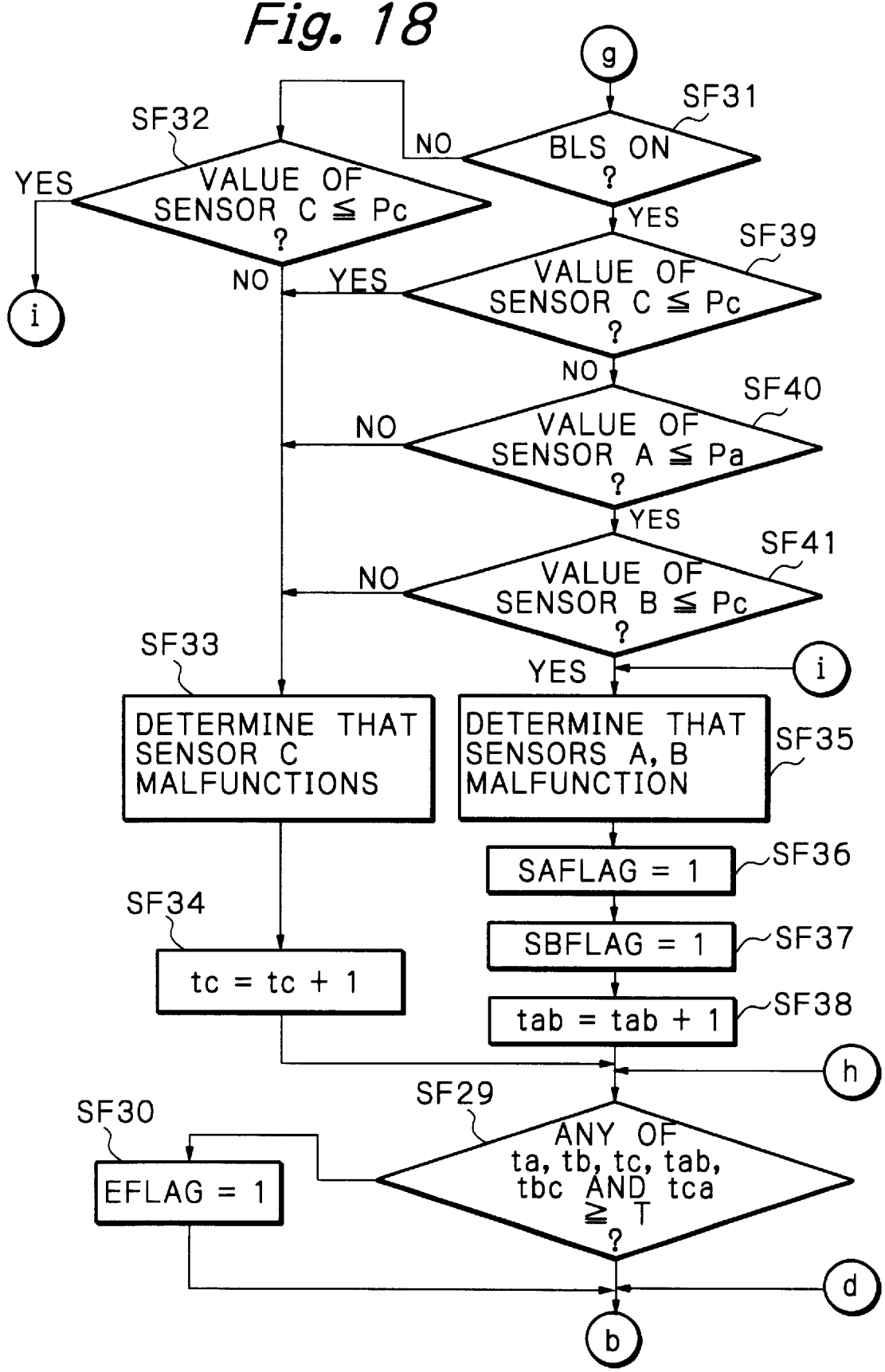
FIG. 18 is a flow chart showing another part of the control process used in the eighth embodiment of the vehicle brake control system to determine whether or not an electrical system failure occurs.
Figure 19:
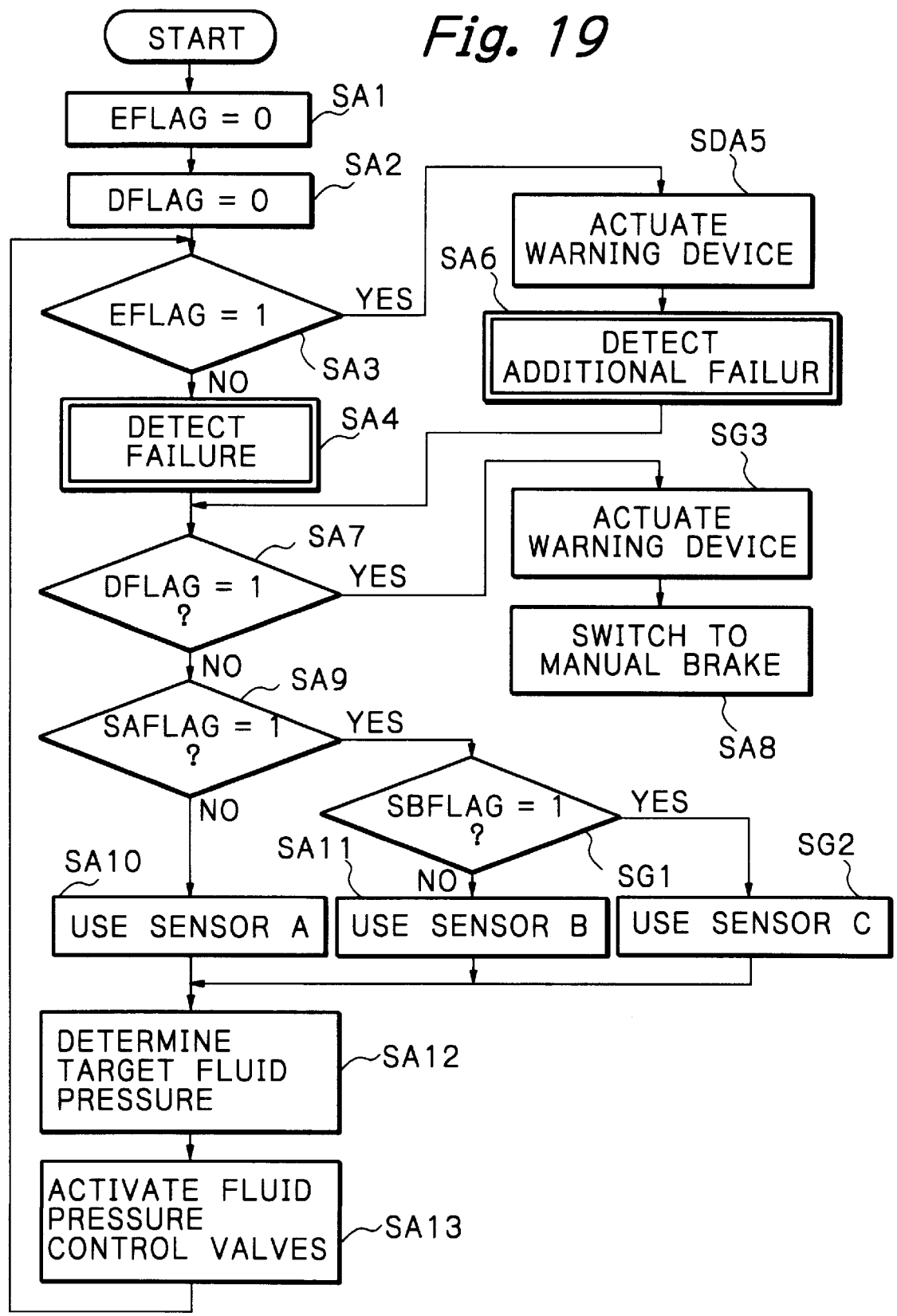
FIG. 19 is a flow chart showing another main loop program used in the seventh and eighth embodiments of the vehicle brake control system.

Referring to FIGS. 17 to 19, there is illustrated a vehicle brake control system according to an eighth embodiment of the present invention. Reference will be made particularly to those which are different from the seventh embodiment. Like parts are given like reference numerals.

Step SD8 to SD22 in the seventh embodiment shown in FIG. 15 are different from those in the eighth embodiment.

Referring to FIG. 14, in step SD7, if all of the absolute values Sab, Sbc and Sca are not equal to or greater than the determination value k, then step SF1 is executed to determine whether or not the absolute values Sab and Sca are both equal to or greater than the determination value k. If the answer to this question is "no", then step SF2 is executed to determine whether or not the absolute values Sab and Sbc are both equal to or greater than the determination value k. If the answer to this question is "no", then step SF3 is executed to determine whether or not the absolute values Sbc and Sca are equal to or greater than the determination value k. If the answer to this question is "no", it is found that no failure occurs in the sensors A to C. Step SF4 is then executed to set the timer counters ta, tb and tc to zero. In step SF5, the timer counters tab, tbc and tca are set to zero. Step SF6 is also executed to set the timer counter t1 to zero. This completes the process of step SA4.

In step SF1, if the absolute values Sab and Sca are both equal to or greater than the determination value k, then step SF7 is executed to determine whether the brake lever switch 14 is on or off. If the brake lever switch 14 is off, step SF8 is executed to determine whether or not the value of the sensor A is equal to or less than an upper limit value Pa of the range which surely determines absence of brake operation. If the answer to this question is "no", it is found in step SF9 that the sensor A malfunctions. This is because the brake lever switch 14 is off, whereas the value of the sensor A indicates that the brake is operated. The process is continued with step 10 where SAFLAG is set to 1. Following this step, step SF11 is initiated by adding 1 to the timer counter ta, namely, ta=ta+1.

In step SF8, if the value of the sensor A is equal to or less than the upper limit value Pa, it is found in step SF12 that a failure occurs in the sensors B and C, but not the sensor A. There is a possibility that the sensor B malfunctions. Accordingly, in step SF13, SBFLAG is set to 1. Step SF14 is then executed to add 1 to the timer counter tbc, namely, tbc=tbc+1.

In step SF7, if the brake lever switch 14 is on, then step SF15 is executed to determine whether or not the value of the sensor A is equal to or less than the upper limit value Pa. If the answer to this question is "yes", it means that the value of the sensor A contradicts the on state of the brake lever switch 14. The program proceeds to step SF9. In SF9, the sensor A is found to malfunction. If, on the other hand, the value of the sensor A is not equal to or less than the upper limit value Pa, the sensor A is found to be properly functioning since the value of the sensor A coincides with the on state of the brake lever switch 14. Thus, there is a possibility that the both sensors B and C malfunction. To this end, step SF16 is executed to determine whether or not the value of the sensor B is equal to or less than an upper limit value Pb. If the answer to this question is "no", the program proceeds to step SF9 since the value of the sensor B coincides with the state of the brake lever switch 14. If, on the other hand, the value of the sensor B is equal to or less than the upper limit value Pb, then step 17 is executed to determine whether or not the value of the sensor C is equal to or less than the upper limit value Pc. If the answer to this question is "no, the program proceeds to step SF9 since the value of the sensor C coincides with the state of the brake lever switch 14. If, on the other hand, the value of the sensor C is equal to or less than the upper limit value Pc, it means that the value of the sensor C contradicts the state of the brake switch lever 14. The program proceeds to step SF12 where the sensors B and C are found to malfunction.

In step SF2, if the absolute values Sac and Sbc are both equal to or greater than the determination value k, then step SF18 is executed to determine whether the brake lever switch 14 is on or off. If the brake lever switch 14 is off, then step SF19 is executed to determine whether or not the value of the sensor B is equal to or less than the upper limit value Pb. If the answer to this question is "no", it is found in step SF20 that the sensor B malfunctions since the value of the sensor B contradicts the state of the brake lever switch 14. The process is continued with step SF21 where SBFLAG is set to 1. Following this step, step SF22 is executed to add 1 to the timer counter tb, namely, tb=tb+1.

In step SF19, if the value of the sensor B is equal to or less than the upper limit value Pb, it is found in step SF23 that no failure occurs in the sensor B since the value of the sensor B coincides with the state of the brake lever switch 14. On the other hand, the sensors A and c are found to malfunction. There is a possibility that the sensor A malfunctions. Step SF24 is then executed to set SAFLAG to 1. Following this step, step SF25 is executed to add 1 to the timer counter tac, namely, tac=tac+1.

In step SF18, if the brake switch lever 14 is on, then step SF26 is executed to determine whether or not the value of the sensor B is equal to or less than the upper limit value Pb. If the answer to this question is "yes", the program proceeds to step SF20. In SF20, the sensor B is found to malfunction since the value of the sensor B contradicts the state of the brake lever switch 14. If the value of the sensor B is not less than the upper limit value Pb, it means that the sensor B is properly functioning since its value substantially coincides with the state of the brake lever switch 14. There is a possibility that the sensors A and B both malfunction. To this end, step SF27 is executed to determine whether or not the value of the sensor A is equal to or less than the upper limit value Pa. If the answer to this question is "no", the program proceeds to step SF20 since its value substantially coincides with the state of the brake lever switch 14. If, on the other hand, the value of the sensor A is equal to or less than the upper limit value Pa, then step SF28 is executed to determine whether or not the value of the sensor C is equal to or less than the upper limit value Pc. This is because the value of the sensor A contradicts the state of the brake lever switch 14. If the value of the sensor C is not less than the upper limit value Pc, the program proceeds to step SF20 since the value of the sensor C substantially coincides with the state of the brake lever switch 14. If, on the other hand, the value of the sensor C is equal to or less than the upper limit value Pc, it is found in step SF23 that the both sensors A and C malfunction.

At the completion of steps SF11, SF14, SF22 and SF25, step SF29 is executed to determine whether or not any of the timer counters ta, tb, tc, tab, tbc and tca is equal to or greater than the predetermined value T. If the answer to this question is "no", the control process of step SA4 is completed. If, on the other hand, the answer is "yes", it means that a failure occurs. Then, in step SF30, EFLAG is set to 1. This completes the process of step SA4 is completed.

In step SF3, if the both absolute values Sbc and Sca are equal to or greater than the determination value k, then step SF31 is executed to determine whether the brake lever switch 14 is on or off. If the brake lever switch is off, step SF32 is executed to determine whether or not the value of the sensor C is equal to or less than the upper limit value Pc. If the answer to this question is "no", it is found in step SF33 that a failure occurs in the sensor C since its value contradicts the state of the brake lever switch 14. Then, step SF34 is executed to add 1 to the timer counter tc, namely, tc=tc+1. Following this step, the program proceeds to step SF29.

In step SF32, if the value of the sensor C is equal to or less than the upper limit value Pc, it is found in step SF35 that no failure occurs in the sensor C, but the sensors A and B malfunction. Step SF36 is then executed to set SAFLAG to 1 so as to indicate that a failure occurs in the sensor A. Also, step SF37 is executed to set SBFLAG to 1 so as to indicate that a failure occurs in the sensor B. Step SF38 is then initiated by adding 1 to the timer counter tab, namely, tab=tab+1. The program then proceeds to step SF29.

In step SF31, if the brake switch lever 14 is on, step SF39 is executed to determine whether or not the value of the sensor C is equal to or less than the upper limit value Pc. If the answer to this question is "yes" it means that the value of the sensor C contradicts the state of the brake lever switch 14. The process is continued with step SF33 where the sensor C is found to malfunction. If, on the other hand, the value of the sensor C is not equal to or less than the upper limit value Pc, it means that the value of the sensor C substantially coincides with the state of the brake lever switch 14. Thus, the sensor C is properly functioning. However, there is a possibility that a failure occurs in the both sensors A and B. To this end, step SF40 is executed to determine whether or not the value of the sensor A is equal to or less than the upper limit value Pa. If the answer to this question is "no", it means that the value of the sensor A substantially coincides with the state of the brake lever switch 14. The program then proceeds to step SF33. If, on the other hand, the value of the sensor A is equal to or less than the upper limit value Pa, step SF41 is executed to determine whether or not the value of the sensor B is equal to or less than the upper limit value Pb. If the answer to this question is "no", it means that the value of the sensor B substantially coincides with the state of the brake lever switch 14. The program then proceeds to step SF33. If, on the other hand, the value of the sensor B is equal to or less than the upper limit value Pb, it is found in step SF35 that a failure occurs in the sensors A and B since the value of the sensor B contradicts the state of the brake lever switch 14.

In the eighth embodiment, if no failure in the sensors A to C is found, instep SA4, steps SF1 to SF6 are executed. Then, in step SA9, SAFLAG is not found to be 1. In step SA10, the sensor A is employed.

Under the circumstances, if the sensor A is found to malfunction, in step SA4, steps SF9, SF23 and SF35 are executed so as to detect a failure in the sensor A. In step SF10, SF24 and SF36, SAFLAG is set to 1. Accordingly, in steps SA9 to SA11, the sensor B is employed.

In the seventh and eighth embodiments, the main loop program shown in FIG. 10 may be replaced by that shown in FIG. 19 so as to use output signals sent from the sensor C when a failure occurs in the sensors A and B.

In the flow chart shown in FIG. 19, if in step SA9, SAFLAG is set to 1, it means that a failure in the sensor A is found. Then, step SG1 is executed to determine whether or not SBFLAG is set to 1. If the answer to this question is "no", it means that no failure in the sensor B is found. In step SA11, output signals from the sensor B are used to detect the amount of operation of the brake. If, on the other hand, SBFLAG is set to 1, it means that a failure occurs in the sensor B. In step SG2, output signals from the sensor C are used to detect the amount of operation of the brake. Also, if in step SA7, DFLAG is set to 1, step SG3 is executed to actuate the warning device 72. The process is continued with step SA8.

A target fluid pressure is determined based on output signals sent from one of the sensors A to C as selected. The fluid pressure control valves 21a to 21d are then driven to enable the wheel cylinders 28a to 28d to produce the target fluid pressure.

Illustratively, output signals from the sensor C can be used in the event that a failure occurs in the sensors A and B.

In the seventh and eighth embodiments, the timer counters are set for each mode of failure detection process. Alternatively, the timer counters may be commonly set in the both modes of failure detection process. Illustratively, the common determination value T is used. Alternatively, it may be independently determined for each mode of failure detection process.

Illustratively, the depression sensor 11, the stroke sensor 71 or the master cylinder pressure sensor 72 forms the sensors A to C, and output signals from these three sensors are used to detect a sensor failure. Alternatively, like or different sensors may be used to detect the amount of operation of the brake as far as at least three sensors are provided. For example, four or more sensors may be used to detect a sensor failure. Also, any other types of sensors may be used as far as they function to detect the amount of operation of the brake.

While the particular embodiments of the present invention have been illustrated and described, it will be obvious to those skilled in the art that changes and modifications may be made without departing from the scope and spirit of the invention. The matter set forth in the foregoing description and accompanying drawings is offered by way of illustration only and not as a limitation. The actual scope of the invention is thus intended to be defined in the following claims.

What is claimed is:

1. A vehicle brake control system comprising:

brake operation sensor means for detecting an amount of operation of a brake pedal and providing a corresponding output signal;

a plurality of electrical fluid pressure control valves operative to adjust brake fluid pressure to be transmitted from a source of fluid pressure to wheel cylinders;

brake fluid pressure control means for controlling operation of said electrical fluid pressure control valves based on the output signal from said brake operation sensor means;

a master cylinder for transmitting to the wheel cylinders in response to operation of the brake pedal;

a plurality of electrical switch valves connected between said electrical fluid pressure control valves and the wheel cylinders and between said master cylinder and the wheel cylinders and adapted to permit selective connection between the wheel cylinders and said electrical fluid pressure control valves and between the wheel cylinders and said master cylinder; and switch control means for controlling operation of said electrical switch valves, said electrical fluid pressure control valves being associated with respective wheels or with respective ones of a plurality of wheel groups each comprised of a plurality of wheels, and said electrical switch valves being associated with the respective electrical fluid pressure control valves or with respective ones of a plurality of control valve groups each comprised of a plurality of electrical fluid pressure control valves, a plurality of power supply relays associated with the respective fluid pressure control valves or with respective ones of a plurality of control valve groups each comprised of a plurality of electrical fluid pressure control valves so that the fluid pressure control valves and the switch valves are connected in parallel to a power source through the associates relays, a plurality of failure sensor means associated with the respective electrical fluid pressure control valves or with respective ones of control valve groups each comprised of a plurality of fluid pressure control valves for sensing a failure, and failure control means operative when a failure in any of said electrical fluid pressure control valves or said groups of the same is detected by said failure sensor means and adapted to control a corresponding one of said power supply relays so as to cause only a corresponding one of said electrical switch valves associated with the fluid pressure control valves or the groups of the same in which the failure is detected to connect a corresponding one of the wheel cylinders to said master cylinder.

2. A vehicle brake control system according to claim 1, wherein said brake operation sensor means includes at least two brake operation sensors for detecting the amount of operation of the brake pedal and providing corresponding output signals, and wherein the control system further comprises:
a brake switch for detecting whether the brake pedal is depressed and providing a corresponding output signal, and output switch control means for causing one of the brake operation sensors to send the output signal to said brake fluid pressure control means and receiving the output signals from said brake switch and the brake operation sensors so as to determine as to whether a failure in said one brake operation sensor occurs, said output switch control means being operable to cause the other brake operation sensor to send the output signal to said brake fluid pressure control means if a failure in said one brake operation sensor occurs.

3. A vehicle brake control system according to claim 1, wherein, said brake operation sensor means includes at least three brake operation sensors for detecting the amount of operation of the brake pedal and providing corresponding output signals, and wherein the control system further comprises:
output switch control means for causing one of the brake operation sensors to send the output signal to said brake fluid pressure control means and receiving the output signals from the brake operation sensors so as to determine as to whether a failure in said one brake operation sensor occurs, said output switch control means being operable to cause one of the other brake operation sensors to transmit the output signal to said brake fluid pressure control means if a failure in said one brake operation sensor occurs.

4. A vehicle brake control system comprising:

brake operation sensor means for detecting an amount of operation of a brake pedal and providing a corresponding output signal;

an electrical fluid pressure control valve operative to adjust brake fluid pressure to be transmitted from a source of fluid pressure to wheel cylinders;

brake fluid pressure control means for controlling operation of said electrical fluid pressure control valves based on the output signal from said brake operation sensor means;

a master cylinder for transmitting to the wheel cylinders in response to operation of the brake pedal;

an electrical switch valve connected between said electrical fluid pressure control valve and the wheel cylinders and between said master cylinder and the wheel cylinders and adapted to permit selective connection between the wheel cylinders and said electrical fluid pressure control valve and between the wheel cylinders and said master cylinder; and switch control means for controlling operation of said electrical switch valve, said brake operation sensor means including at least two brake operation sensors for detecting the amount of operation of the brake pedal and providing corresponding output signals, a brake switch for detecting whether the brake pedal is depressed and providing a corresponding output signal, and output switch control means for causing one of the brake operation sensors to send the output signal to said brake fluid pressure control means and receiving the output signals from said brake switch and the brake operation sensors so as to determine as to whether a failure in said one brake operation sensor occurs, said output switch control means being operable to cause the other brake operation sensor to send the output signal to said brake fluid pressure control means if a failure in said one brake operation sensor occurs.

5. A vehicle brake control system comprising:

brake operation sensor means for detecting an amount of operation of a brake pedal and providing a corresponding output signal;

an electrical fluid pressure control valves operative to adjust brake fluid pressure to be transmitted from a source of fluid pressure to wheel cylinders;

brake fluid pressure control means for controlling operation of said electrical fluid pressure control valve based on the output signal from said brake operation sensor means;

a master cylinder for transmitting to the wheel cylinders in response to operation of the brake pedal;

an electrical switch valve connected between said electrical fluid pressure control valve and the wheel cylinders and between said master cylinder and the wheel cylinders and adapted to permit selective connection between the wheel cylinders and said electrical fluid pressure control valve and between the wheel cylinders and said master cylinder; and switch control means for controlling operation of said electrical switch valves, said brake operation sensor means including at least three brake operation sensors f or detecting the amount of operation of the brake pedal and providing corresponding output signals, output switch control means for causing one of the brake operation sensors to send the output signal to said brake fluid pressure control means and receiving the output signals from the brake operation sensors so as to determine as to whether a failure in said one brake operation sensor occurs, said output switch control means being operable to cause one of the other brake operation sensors to transmit the output signals to said brake fluid pressure control means if a failure in said one brake operation sensor occurs.

\* \* \* \* \*